US012576430B2

(12) United States Patent
Allred, Jr.

(10) Patent No.: US 12,576,430 B2
(45) Date of Patent: Mar. 17, 2026

(54) METHOD OF PRETREATING A PIPELINE OR APPARATUS

(71) Applicant: Riddle's Dehi & Chemical Services Co., Inc., Kilgore, TX (US)

(72) Inventor: James A. Allred, Jr., Alba, TX (US)

(73) Assignee: Pig Sweep, LLC, Kilgore, TX (US)

( * ) Notice: Subject to any disclaimer, the term of this patent is extended or adjusted under 35 U.S.C. 154(b) by 377 days.

(21) Appl. No.: 18/343,123

(22) Filed: Jun. 28, 2023

(65) Prior Publication Data

US 2023/0338988 A1 Oct. 26, 2023

Related U.S. Application Data

(63) Continuation-in-part of application No. 17/655,648, filed on Mar. 21, 2022, now Pat. No. 11,692,126.

(51) Int. Cl.
*B05D 7/22* (2006.01)

(52) U.S. Cl.
CPC .......... *B05D 7/225* (2013.01); *B05D 2254/04* (2013.01); *B05D 2401/32* (2013.01); *B05D 2601/22* (2013.01)

(58) Field of Classification Search
CPC ................ B05D 7/225; B05D 2254/04; B05D 2401/32; B05D 2601/22; B05D 5/08; C23F 13/08; C23F 2213/32; C09K 8/54; C09K 2208/10; C09K 2208/28; F16L 58/1009; F16L 2101/16
See application file for complete search history.

(56) References Cited

U.S. PATENT DOCUMENTS

| | | | |
|---|---|---|---|
| 4,425,385 | A | 1/1984 | Coulter et al. |
| 4,579,596 | A | 4/1986 | Murzyn |

(Continued)

FOREIGN PATENT DOCUMENTS

| | | | |
|---|---|---|---|
| EP | 1304189 | A2 | 4/2003 |
| WO | WO2010070354 | A1 | 6/2010 |

(Continued)

OTHER PUBLICATIONS

Vert et al., Terminology for biorelated polymers and applications (IUPAC Recommendations 2012), Pure and Applied Chemistry, Jan. 11, 2012, pp. 377-410, pp. 377-379, 393, vol. 84, No. 2.

(Continued)

*Primary Examiner* — Aiqun Li
(74) *Attorney, Agent, or Firm* — Grady K. Bergen; Griggs Bergen LLP

(57) ABSTRACT

A method of operating a pipeline or apparatus is carried out by subjecting a pretreated component of a pipeline or apparatus to electrochemical corrosion protection. The pretreated component has surfaces previously treated with a coating of a treatment composition of a colloidal particle dispersion having inorganic nanoparticles with an average particle size from 500 nm or less that exhibit properties of Brownian motion. At least some of the inorganic nanoparticles of the treatment composition are ionically charged nanoparticles. The surfaces of the pretreated component are fresh surfaces or surfaces where any residues or deposits that have been previously formed on the surfaces from prior material contact have been removed prior to being treated.

20 Claims, 4 Drawing Sheets

(56) References Cited

U.S. PATENT DOCUMENTS

| | | | |
|---|---|---|---|
| 5,012,868 | A | 5/1991 | Bridges |
| 6,986,358 | B2 | 1/2006 | Mattox et al. |
| 7,544,726 | B2 | 6/2009 | Greenwood |
| 11,059,079 | B1 | 7/2021 | Allred, Jr. |
| 11,077,474 | B1 | 8/2021 | Allred, Jr. |
| 11,692,126 | B1 | 7/2023 | Allred, Jr. |
| 2010/0096139 | A1 | 4/2010 | Holcomb et al. |
| 2011/0165331 | A1 | 7/2011 | Barth et al. |
| 2012/0168165 | A1 | 7/2012 | Holcomb et al. |
| 2014/0072653 | A1 | 3/2014 | Buschmann et al. |
| 2014/0290692 | A1 | 10/2014 | Hall et al. |
| 2014/0374095 | A1 | 12/2014 | Ladva et al. |
| 2015/0065398 | A1 | 3/2015 | Gartland et al. |
| 2015/0368809 | A1 | 12/2015 | Atkins et al. |
| 2016/0017204 | A1 | 1/2016 | Hill et al. |
| 2017/0088767 | A1 | 3/2017 | Talley |
| 2018/0291255 | A1 | 10/2018 | Southwell |
| 2018/0291261 | A1 | 10/2018 | Southwell |
| 2018/0298299 | A1 | 10/2018 | Yu et al. |
| 2019/0078015 | A1 | 3/2019 | Southwell et al. |
| 2019/0093462 | A1 | 3/2019 | Watts et al. |
| 2019/0136123 | A1 | 5/2019 | Holcomb et al. |
| 2019/0225871 | A1 | 7/2019 | Southwell |
| 2021/0213495 | A1 | 7/2021 | Allred, Jr. |
| 2021/0355367 | A1 | 11/2021 | Allred, Jr. |
| 2022/0106519 | A1 | 4/2022 | Allred, Jr. |

FOREIGN PATENT DOCUMENTS

| | | | |
|---|---|---|---|
| WO | WO2010096381 | A1 | 8/2010 |
| WO | WO2016082876 | A1 | 6/2016 |
| WO | WO2019067406 | A1 | 4/2019 |
| WO | WO2020251573 | A1 | 12/2020 |
| WO | WO2021146135 | A1 | 7/2021 |
| WO | WO2021247554 | A1 | 12/2021 |

OTHER PUBLICATIONS

Ding et al., The excellent anti-wear and friction reduction properties of silica nanoparticles as ceramic water lubricant additives, Ceramics International, Apr. 25, 2018, pp. 14901-14906, vol. 44.

International Search Report and Written Opinion dated Jul. 3, 2023 in counterpart International PCT Application No. PCT/US2023/063896.

Extended European Search Report dated Jan. 10, 2024 in related European Application No. EP21741814.4.

Office Action dated Oct. 23, 2024 in U.S. Appl. No. 18/344,647, pp. 1-33.

Nissan Chemical America Corporation, nanoActiv® Product Information Sheet, 2019, pp. 1-4.

Plaintiff's Original Complaint in Civil Action No. 4:24-cv-01784 in U.S. District Court for the Southern District of Texas, Houston Division, May 13, 2024, part 1 of 3 (beginning through Exhibit E), pp. 1-69.

Plaintiff's Original Complaint in Civil Action No. 4:24-cv-01784 in U.S. District Court for the Southern District of Texas, Houston Division, May 13, 2024, part 2 of 3 (Exhibits F-H), pp. 1-45.

Plaintiff's Original Complaint in Civil Action No. 4:24-cv-01784 in U.S. District Court for the Southern District of Texas, Houston Division, May 13, 2024, part 3 of 3 (Exhibit I to end), pp. 1-43.

International Search Report and Written Opinion dated Nov. 15, 2024 in counterpart International PCT Application No. PCT/US2024/035707, pp. 1-14.

Extended European Search Report for related European Patent Application No. EP23775787.7 dated Sep. 16, 2025, pp. 1-9.

METHOD OF PRETREATING A PIPELINE OR APPARATUS

CROSS-REFERENCE TO RELATED APPLICATIONS

This application is continuation-in-part of U.S. patent application Ser. No. 17/655,648, filed Mar. 21, 2022, now U.S. Pat. No. 11,692,126, which is hereby incorporated by reference in its entirety for all purposes.

TECHNICAL FIELD

The disclosure relates to methods of pretreating pipelines, apparatuses, systems, process equipment or components thereof using particular treatment compositions.

BACKGROUND

Pipelines are used throughout the world to efficiently and economically transport large quantities of fluids over great distances. Some of these pipelines may be hundreds and sometimes thousands of miles in length, particularly those used to transport crude and refined petroleum oil, natural gas, chemicals, etc. Friction between the interior surfaces of the walls of the pipeline and the fluid flowing through the pipeline can result in significant pressure drops and a decrease in fluid flow rate over the length of the pipeline. As a result, pumps or compressors typically must be staged along the length of the pipeline to repressurize the fluid and increase fluid flow. Higher friction levels decrease the flow-rate within the pipeline, requiring more demand on pumps and compressors and/or requiring larger and/or more pumps or compressors to transport a given fluid through the pipeline, thus increasing the cost of constructing and operating the pipeline.

Pipelines used for these fluids are typically formed from metals, such as carbon steel. While the exterior of the pipelines are typically painted or covered with a protective coating to prevent corrosion, the interior of the pipelines are typically unprotected or bare metal so that they are subject to corrosion. Cathodic corrosion protection, where a small electrical current is applied to the pipeline so that it becomes cathodic, can offer some protection against internal pipe corrosion, but this does not prevent all corrosion.

Deposits may also begin to form on the surfaces of pipelines and other process equipment from prolonged contact with the transported or process fluids. These deposits also tend to increase friction and increase pressure drop and reduce fluid flow. Additionally, the deposits that form on the interior surfaces of the pipeline can form corrosion cells in which under-deposit corrosion can occur. Such corrosion cells require the presence of water in the pipeline, which forms the electrolyte in the corrosion cell. This water is typically present in the pipeline as entrained water within the transported fluids. Fluids that are conveyed through pipelines typically contain some water. Even dry natural gas has some amount of water (e.g., 4-7 lbs water/MMSCF of gas) that allows the formation of corrosion cells. The water can penetrate these surface deposits becoming entrapped under the deposit to form the corrosion cell and facilitate the under-deposit corrosion.

There are various sources of these corrosion causing materials. This can include carbon dioxide ($CO_2$) and hydrogen sulfide ($H_2S$) that may be present in the transported fluids. Carbon dioxide hydrates in the presence of water to form carbonic acid ($H_2CO_3$). The acid in turns reacts with the iron or steel to form corrosion. The hydrogen sulfide also reacts with the iron or steel material of the pipeline to form iron sulfides, thus corroding and degrading the pipe. These materials can penetrate the surface deposits to form the corrosion cells.

Microbiologically influenced corrosion (MIC) from microbes or bacteria that may be present in the fluids is also a source of corrosion. These microbes or bacteria may attach to the internal surfaces of the pipeline or under the surface deposits and grow as a colony to form a biofilm on the surfaces of the pipe. These microbes are often present in fluids produced from subterranean formations, such as oil and gas wells. The microbes are typically chemoautotrophs, which obtain energy by the oxidation of electron donors from their surroundings. One type of such microbes are sulfate-reducing bacteria (SRB). SRBs utilize sulfate ions ($SO_4^{2-}$) that are reduced to $H_2S$. Water within the pipeline will interact with the metal surfaces to create a layer of molecular hydrogen. The SRBs through anaerobic respiration will then utilize the sulfate ions so that the hydrogen layer on the walls of the pipeline is oxidized to $H_2S$, which in turns reacts with iron to form iron sulfides. Another type of MIC that leads to corrosion in pipelines is that produced by acid producing bacteria (APB). ABPs undergo anaerobic fermentation instead of anaerobic respiration, producing acids as part of their growth cycle. These produced acids lead to the acid corrosion of the metal materials of the pipeline.

To remove these deposits, coatings, and other detrimental materials, a maintenance program is carried out. This essentially involves passing a projectile, commonly referred to as a "pig," down the interior of the pipeline so that the deposits are physically scraped off the sides of the pipeline as the pig is moved through the pipeline. This process, referred to as "pigging" is sometimes done in conjunction with a chemical treatment. Pigging treatments are usually conducted "on-line" without interfering with the transporting of fluids. While such treatments have been used with limited success, improvements are needed.

Additionally, various processing and storage devices and equipment that are used to treat, store, conduct, contain, or process various fluids in a variety of industries are also subject to the buildup of various surface deposits. The surfaces of these devices and equipment may benefit from friction reduction and to reduce the need to be cleaned periodically to remove the deposits.

The present disclosure has application to pretreating these pipelines and different apparatuses and equipment reduce surface friction to increase fluid flow and/or lower pressure drop to thereby lessen the demand upon pumps and compressors and to provide a protective coating to reduce the buildup of surface deposits, which can also increase friction and corrosion.

BRIEF DESCRIPTION OF THE DRAWINGS

For a more complete understanding of particular embodiments of the disclosure, and the advantages thereof, reference is now made to the following descriptions taken in conjunction with the accompanying figures, in which.

DETAILED DESCRIPTION

Figure 1:
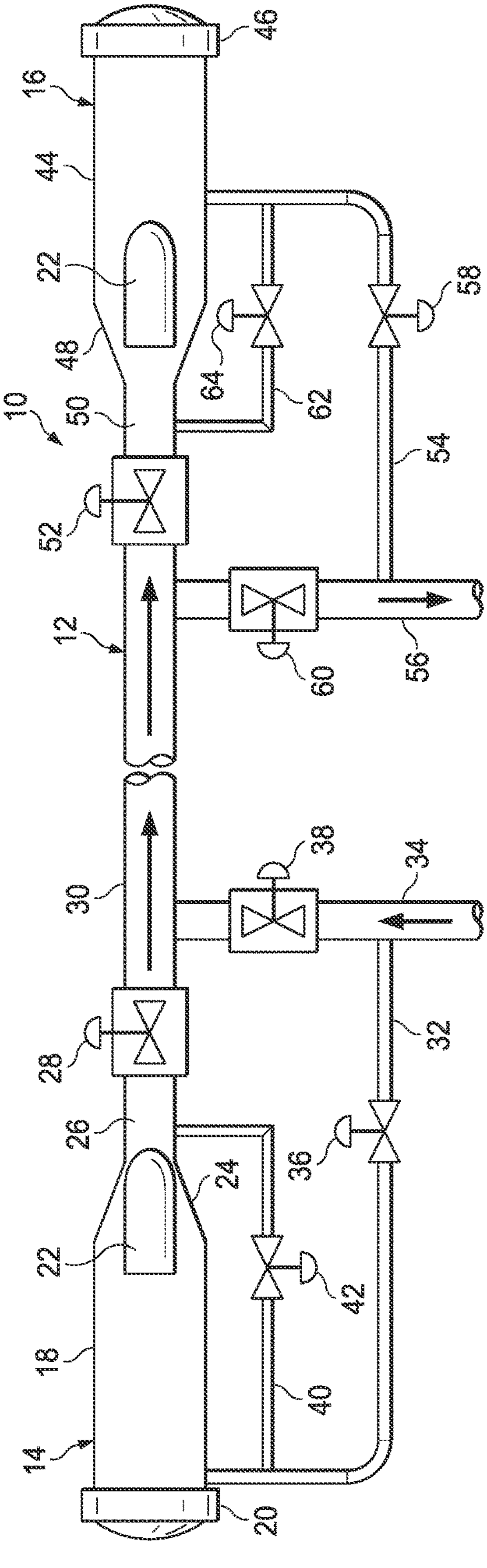
FIG. 1 (PRIOR ART)
FIG. 1 is a schematic of a pipeline and pipeline segment having a pig launcher and receiver for passing a pig through the pipe to facilitate application of a pretreatment composition within the of the pipeline.

The present disclosure describes a method of pretreating a pipeline wherein a particular pretreatment composition is used in combination with one or more pigging operations. Referring to FIG. 1, a schematic of an exemplary pipeline 10 having a pipeline segment 12 is shown to illustrate the treatment method. The pipeline 10 may be any pipeline used for gathering, conveying and transporting fluids where the interior of the pipeline may require routine or periodic cleaning and maintenance. This may include pipelines used for gathering and/or transporting hydrocarbons, such as crude and refined petroleum oil, natural gas, natural gas liquids (NGLs), chemicals, bio-oils, biofuels, etc. The pipeline may also be used to transport water or other aqueous fluids in certain instances. The pipeline 10 and/or pipeline segment 12 may be of varying lengths, from several feet to many miles.

The pipeline 10 being pretreated constitutes a new or fresh pipeline or pipeline section where the pipeline or section has not previously been exposed to fluids or materials or only been exposed to minimal fluids or materials, for which the pipeline 10 is intended to be use or have transported through its interior. This may be a fresh pipeline that has only been in use for transporting fluids or materials for two months, six weeks, four weeks, three weeks, two weeks, one week, 6 days, 5 days, 4 days, 3 days, 2 days, 24 hours, 12 hours, or one hour or less. At such early stages of use, the fresh pipeline should be relative free or have very minimal residue build up on the pipeline surfaces. The interior surfaces of the new or fresh pipeline are thus essentially bare or substantially bare, without residues or any significant residues or buildup that might otherwise be formed on the surfaces of the pipeline. Such bare surfaces are meant to include any installed surface coatings, such as anti-corrosion coatings (e.g., Perma-Bond epoxy), which may have been previously provided on the pipeline surfaces during its manufacture and construction, but prior to its use for transporting fluids. The bare surfaces may also include mill scale, flash rust, or other surface coatings, which may be present on the surfaces of the pipe that result from the manufacturing, shipping, or construction of the pipeline or section.

The pipeline 10 being pretreated may also be a non-fresh pipeline that may have been previously used or had prior extensive fluid or material flow that may have resulted in a buildup of residues, but where the pipeline has been treated to remove such residues from the interior surfaces from all or a portion of the pipeline. Such non-fresh pipelines that have been treated to remove surface residues may be referred herein as "fresh-like" pipelines, even though they have been previously used.

The pipe and components of the pipeline are typically formed of metal materials. These may include iron, aluminum, copper, metal alloys, and the like. In most applications, the pipelines or portions thereof are formed from iron or steel, such as carbon steel, mild or low carbon steel, cast iron, stainless steel, etc. In some instances, non-metal materials may also be used for the pipelines or portions thereof. These may include materials such as clay, plastic or polymeric materials, PVC, polypropylene, fiberglass, etc. For pipelines used for transporting natural gas and petroleum products, the pipelines are typically constructed from carbon steel.

The pipe of the pipeline or pipeline segment may be of various widths or diameters, from a fraction of an inch or a few inches to several feet (e.g., from ¼ in to 5 ft or more) in diameter. For pipelines used for transmission of fluids over great distances, such as natural gas and petroleum products, the pipelines are typically quite large in diameter (e.g., 24 to 42 inches).

The pipeline 10 may be divided into a number of different pipeline sections or segments 12 along its length. The pipeline segments 12 facilitate maintenance, operation and inspection of portions of the pipeline 10. The pipe segment 12 may have a uniform diameter along its length. Each segment 12, which may itself be several hundred feet to many miles in length, may be provided with a pig launcher assembly 14 at one end and a pig receiver assembly 16 at an opposite end. The launcher and receiver assemblies 14, 16 shown and described herein are exemplary of those commonly used in pipelines. Variations of these assemblies may also be used.

The pig launcher assembly 14 is located at an upstream end of the pipe segment 12 relative to the direction of fluid flow within the pipeline. Similarly, the pig receiver assembly 16 is located on a downstream end of the pipe segment 12. The launcher assembly 14 has an enlarged or major barrel or pipe portion 18 with opening at the end of the barrel 18 for accessing the interior of the barrel 18. An access door or closure 20 is provided for selectively accessing and closing off the end opening of the barrel 18. This also allows for the introduction of a pig or body 22 as well as other items or materials into the barrel 18.

The pig or body 22 may have a variety of configurations and constructions depending on its purpose. These can include mandrel pigs, foam pigs, solid cast pigs, etc. In the treatment methods disclosed herein, at least one pig or body is sized and configured to apply, spread or coat a pretreatment composition on the interior surfaces of the pipeline. Such pigs or bodies may have a reduced diameter or diameter portion to facilitate spreading of the treatment composition so that it is spread generally around the entire circumference of the pipe interior and so that the treatment composition stays in place upon the pipeline walls, without being scraped or otherwise readily removed by the pig or body. The size of the spreader pig or body may be of a selected diameter or size so that in combination with the amount of treatment composition introduced into the pipeline, the treatment composition may be applied at a selected thickness along the length of the pipe segment 12.

The launcher assembly 14 further includes a reducer portion 24 that tapers to a smaller minor barrel portion 26 upstream from a pig trap valve 28, which is coupled to a mainline 30 of the line segment 12. The trap valve 28 is used to selectively open and close off communication between the launcher assembly 14 and the mainline 30 of the pipeline segment 12 and allows the passage of the pig 22 from the minor barrel portion 26 to the mainline 30, which may be of the same or similar diameters.

A kicker line 32 fluidly couples the major barrel portion 18 to a bypass inlet line 34. The bypass inlet line 34 is used to introduce fluid flow from the upstream pipeline 10 into the mainline 30 of the pipeline segment 12. The kicker line 32 diverts fluid flow from the bypass line 34 to the barrel 18. The kicker line 32 may couple to the barrel 18 as far upstream as possible to facilitate launching of the pig or body 22. A trap bypass valve 36 of the kicker line 32 is used to control fluid flow from bypass line 34. A bypass valve 38 is also provided for selectively controlling fluid flow through bypass line 34 to mainline 30.

A balance line 40 is shown fluidly coupled to the kicker line 32 and the minor barrel portion 26 near the trap valve 28. The balance line 40 is used to balance the pressure on both sides of the pig 22 when it is located within the major barrel portion 18 to minimize or prevent movement of the pig 22 within the launcher assembly 14. A control valve 42 allows the balance line 40 to be selectively opened or closed.

Other valves and lines (not shown), such as for venting, purging, injecting, draining fluids, etc., may also be coupled to the launcher assembly 14 and its components to facilitate various functioning of the launcher assembly 14. For example, with both the trap valve 28 and trap bypass valve 38 closed, the barrel 18 may be vented to atmospheric pressure to allow the door 20 to be opened and allowing the pig 22 to be introduced and positioned within the launcher 14.

With the door 20 closed and the pig 22 located within the launcher 14, the trap bypass valve 36 and pig trap valve 28 can be opened and the bypass valve 38 and balance valve 42 can be closed. This causes fluid flow through the bypass line 34 to be directed through the kicker line 32 to the major barrel portion 18. The pig 22 is thereby forced out of the launch assembly 14 so that it is directed downstream down the mainline 30 of pipeline segment 12.

When the pig 22 passes the trap valve 28, the bypass valve 38 can be opened and the trap bypass valve 36 and pig trap valve 28 can be closed. Fluid flow from bypass line 34 through mainline 30 will continue to force the pig 22 downstream down the length of the line segment 12 to the receiver pig assembly 16.

The receiver assembly 16 is configured similarly to the launcher assembly 16. Like the launcher assembly 16, the receiver assembly includes a major barrel portion 44 and access door or closure 46 for selectively closing the end opening of the barrel portion 44. A tapered reducer portion 48 fluidly couples the major barrel portion 44 to a reduced diameter minor barrel portion 50 upstream from the major barrel portion 44. The minor barrel portion 50 is located downstream from a pig trap valve 52, which is coupled to the downstream end of the mainline portion 30 of the line segment 12. The trap valve 52 is used to selectively open and close off communication between the receiver assembly 16 and the mainline portion 30 of the pipeline segment 12 and allows the passage of the pig 22 from the mainline portion 30 to the minor barrel portion 50, which may be of the same or similar diameters.

A return line 54 fluidly couples the major barrel 44 to the bypass outlet line 56. The bypass outlet line 56 directs fluids downstream to the remainder of the pipeline 10. The return line 54 returns fluid flow from the barrel 44 to the bypass outlet line 56. The return line 54 typically couples to the barrel 44 at position near the reducer 48. A trap bypass valve 58 of the return line 54 is used to selectively return fluid flow from barrel 44 through the return line 54 to the bypass outlet line 56. A bypass valve 60 is also provided for controlling fluid flow through bypass line 34 from mainline 30.

A balance line 62 is shown fluidly coupled to the return line 54 and the minor barrel portion 50 near the trap valve 52. The balance line 62 is used to balance the pressure on both sides of the pig 22 when it is located within the major barrel portion 44 to minimize or prevent movement of the pig 22 within the receiver assembly 14. A control valve 64 allows the balance line 62 to be selectively opened or closed.

Other valves and lines (not shown), such as for venting, purging, injecting, draining fluids, etc., may also be coupled to the receiver assembly 16 to facilitate various functioning of the receiver assembly 16.

By opening trap valve 52 and trap bypass valve 58, the pig 22 can be received within the receiver assembly 16. The bypass valve 60 can be closed or partially closed to facilitate directing the pig 22 into the barrel portion 44. When the pig 22 is received within the major barrel portion 44 of the receiver assembly 16, the bypass valve 60 can be fully opened and the trap valve 52 and trap bypass valve 58 closed. The receiver assembly 16 can then be vented to atmospheric pressure and drained so that the access door 46 can be opened and the pig 22 can be removed from the receiver assembly 16.

The pig used to spread the pretreatment composition can be passed through the pipeline using a variety of different fluids. This can be a gas, liquid or a mixture of gas and liquid and can include compressed or pressurized air, nitrogen, natural gas, liquid natural gas (LNG), fresh water, salt water, hydrocarbon liquids, etc. The fluid used to launch and pass the pig through the pipeline can be the same or a different fluid from those for with the pipeline is to be used. Where the fluid used to pass the pig is the same as that to be conducted through the pipeline, the pretreatment can be carried out without interrupting normal fluid flow through the pipeline during its early stages of operation. This is important on major pipelines where disruption in fluid flow (e.g., natural gas) can have significant negative consequences, such as natural gas used fuel to power plants, etc.

Figure 2:
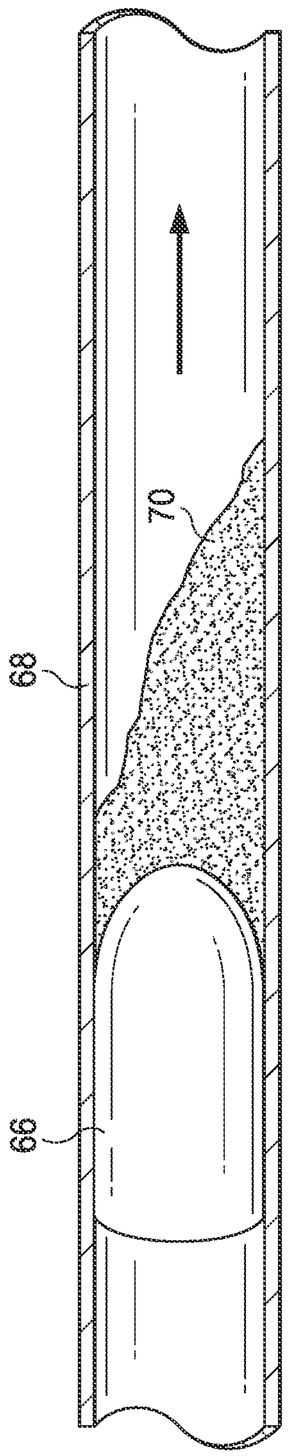
FIG. 2 is a schematic of a pipeline segment showing a single pig and pill of the treatment composition being passed through the pipeline segment.

FIG. 2. illustrates the movement of a spreader pig 66 down through the interior of pipeline segment 68 to be cleaned, which may the same or similar to the pipeline segment 12 of FIG. 1, previously described. The spreader pig 66 may be launched and received through launching and receiving assemblies, which may be the same or similar to those assemblies 14, 16 of FIG. 1 previously described. As shown in FIG. 2, a quantity of the pretreatment composition 70, which is described in more detail later on, in the form of a mass or "pill" is introduced into the pipeline segment 68 ahead of the pig 66. The pig 66 facilitates spreading composition upon surfaces of the interior of the pipeline segment 68 along all or a portion of the length of the segment 68.

Figure 3:
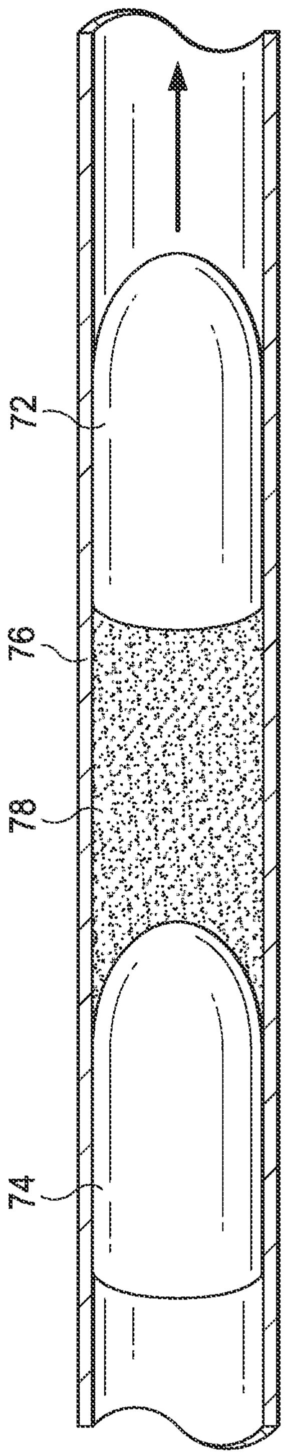
FIG. 3 is a schematic of a pipeline segment showing a dual pig and pill of the treatment composition being passed through the pipeline segment.

FIG. 3 shows another embodiment wherein two pigs 72, 74 are used in pipeline segment 76. Here, pig 72 constitutes a lead pig and pig 74 constitutes a trailing pig. In this embodiment, a mass or pill 78 of the pretreatment composition is introduced between the pigs 72, 74. The pigs 72, 74 facilitate spreading the treatment composition upon surfaces of the interior of the pipeline segment 68 along all or a portion of the length of the segment 76.

The amount of treatment composition used may be selected to provide a desired thickness applied to the walls of a pipeline segment along all or a portion of the length of the pipeline segment. This may be determined by the formula of Equation 1 below:

$$V=\pi\cdot[(R^2-(R-T)^2]\cdot L \quad (1)$$

where V is the total volume of pretreatment composition used, R is the internal radius of the pipe being treated, T is the desired thickness of the treatment composition to be applied to the walls of the pipe, and L is the length of the pipe being treated.

The pretreatment composition used for treating the fresh or fresh-like pipelines in accordance with the disclosure incorporates a colloidal particle dispersion having inorganic nanoparticles. The pretreatment composition is similar to the treatment compositions used in the cleaning of pipelines to remove or penetrate solid deposits formed on the surfaces of the pipeline. Such treatment compositions and their application are described in U.S. Pat. Nos. 11,059,079; 11,077,474; and 11,512,241; and U.S. Pat. App. Pub. No. US2022/0106519A1, each of which is incorporated herein by reference for all purposes. In many cases the inorganic nanoparticles are silica nanoparticles, although other non-silica inorganic nanoparticles can be used alone or with silica nanoparticles. Colloidal silica dispersions using silica nanoparticles have been around for some time. They are typically formed from silica particles that are dispersed in a liquid phase. The liquid phase may be an aqueous or non-aqueous liquid or a combination of such liquids. The nanoparticles are stabilized electrostatically in the liquid so that they tend to stay suspended within the liquid. Non-limiting examples of various colloidal particle dispersions are those described in U.S. Pat. Nos. 7,544,726 and 7,553,888 and U.S. Pat. App. Pub. Nos. US2016/0017204; US2018/0291255; US2018/0291261; US2019/0078015; US2019/0078015; US2019/0136123; US2019/0225871, each of which is incorporated herein by reference for all purposes, including the colloidal particle dispersions and compositions disclosed therein and the methods of making the same. Such colloidal particle dispersions are commercially available. Examples of suitable commercially available colloidal particle dispersions include, but are not limited to, those available from Nissan Chemical America Corporation as nanoActive®, nanoActive® HRT, nanoActive® EFT, and nanoActive® HNP solutions.

The inorganic nanoparticles of the colloidal particle dispersion will typically have particle size to facilitate formation of the colloidal particle dispersion so that the suspension remains stable. In many instances the inorganic nanoparticles will have an average particle size from 500 nm or less. More often they will have an average particle size from 300 nm or less, and still more particularly from 200 nm or less. In some embodiments, the inorganic nanoparticles will have an average particle size of at least, equal to, and/or between any two 0.1 nm to 500 nm, more particularly of at least, equal to, and/or between any two 0.1 nm, 1 nm, 2 nm, 3 nm, 4 nm, or 5 nm to 30 nm, 40 nm, 50 nm, 100 nm, 200 nm, or 300 nm. In certain applications the inorganic nanoparticles may have an average particle size from at least, equal to, and/or between any two of 0.1 nm, 0.2 nm, 0.3 nm, 0.4 nm, 0.5 nm, 0.6 nm, 0.7 nm, 0.8 nm, 0.9 nm, 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm, 31 nm, 32 nm, 33 nm, 34 nm, 35 nm, 36 nm, 37 nm, 38 nm, 39 nm, 40 nm, 41 nm, 42 nm, 43 nm, 44 nm, 45 nm, 46 nm, 47 nm, 48 nm, 49 nm, 50 nm, 51 nm, 52 nm, 53 nm, 54 nm, 55 nm, 56 nm, 57 nm, 58 nm, 59 nm, 60 nm, 61 nm, 62 nm, 63 nm, 64 nm, 65 nm, 66 nm, 67 nm, 68 nm, 69 nm, 70 nm, 71 nm, 72 nm, 73 nm, 74 nm, 75 nm, 76 nm, 77 nm, 78 nm, 79 nm, 80 nm, 81 nm, 82 nm, 83 nm, 84 nm, 85 nm, 86 nm, 87 nm, 88 nm, 89 nm, 90 nm, 91 nm, 92 nm, 93 nm, 94 nm, 95 nm, 96 nm, 97 nm, 98 nm, 99 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, and 500 nm.

It should be noted in the description, if a numerical value, concentration or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range from 1 to 10" is to be read as indicating each and every possible number along the continuum between about 1 and about 10. Thus, even if specific points within the range, or even no point within the range, are explicitly identified or referred to, it is to be understood that the inventor appreciates and understands that any and all points within the range are to be considered to have been specified, and that inventor possesses the entire range and all points within the range, including smaller ranges within the larger ranges.

The inorganic nanoparticles, which are typically silica nanoparticles, may be surface functionalized with hydrophilic monomers and/or a mixture of hydrophilic and hydrophobic monomers. Such surface treatment can make the nanoparticles more stable in high saline or other disruptive conditions. Such surface treatment may be achieved with the use of silane compounds. Organosilanes are particularly useful for such surface modification. The colloidal inorganic nanoparticles can be surface modified by the reaction of colloidal silica surfaces with at least one moiety selected from the group consisting of a monomeric hydrophilic organosilane, a mixture of monomeric hydrophilic and monomeric hydrophobic organosilanes, or a polysiloxane oligomer.

Suitable monomeric hydrophilic organosilanes include, but are not limited to, glycidoxypropyl trimethoxysilane, glycidoxypropyl triethoxysilane, glycidoxypropyl tributoxysilane, glycidoxypropyl trichlorosilane, phenyl trimethoxysilane, phenyl trimethoxysilane, phenyl trichlorosilane, and combinations of these.

Suitable monomeric hydrophobic organosilanes include, but are not limited to, trimethoxy[2-(7-oxabicyclo[4.1.0]hept-3-yl)ethyl]silane, triethoxy[2-(7-oxabicyclo[4.1.0]hept-3-yl)ethyl]silane, trichloro[2-(7-oxabicyclo[4.1.0]hept-3-yl)ethyl]silane, methacryloxypropyl trimethoxysilane, methacryloxypropyl triethoxysilane, methacryloxypropyl trichlorosilane, vinyltrimethoxysilane, vinyltriethoxysilane, vinyltrichlorosilane, isobutyltrimethoxysilane, isobutyltriethoxysilane, isobutyltrichlorosilane, hexamethyldisiloxane, hexamethyldisilazane. and combinations of these.

Suitable polysiloxane oligomers may include, but are not limited to, glycidoxypropyltrimethoxysilane, methacryloxypropyltrimethoxysilane, isobutyltrimethoxysilane, vinyltrimethoxysilane, trimethoxy[2-(7-oxabicyclo[4.1.0]hept-3-yl)ethyltrimethoxysilane, and hexamethyldisiloxane, and combinations of these.

In some instances, the inorganic nanoparticles may be encapsulated in a surfactant. Such encapsulation and surfactants are described, for instance, in U.S. Pat. App. Pub. No. US2016/0017204.

In the pretreatment composition, the amount of nanoparticles in the treatment composition may range from 60 wt %, 50 wt %, 40 wt %, 30 wt % or less by total weight of the treatment composition. In certain instances, the amount of particles will range from 0.001 wt %, 0.01 wt %%, 0.1 wt %, 1 wt %, 2 wt %, 3 wt %, 4 wt %, and 5 wt % to 10 wt %, 15 wt % to 30 wt %, 35 wt %, 40 wt %, 45 wt %, 50 wt %, and 60 wt % by total weight of the colloidal particle dispersion. In certain applications the inorganic nanoparticles may make up from at least, equal to, and/or between any two of 0.001 wt %, 0.002 wt %, 0.003 wt %, 0.004 wt %, 0.005 wt %, 0.006 wt %, 0.007 wt %, 0.008 wt %, 0.009 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.5 wt %, 6.0 wt %, 6.5 wt %, 7.5 wt %, 8.0 wt %, 8.5 wt %, 9.0 wt %, 9.5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, and 60 wt % by total weight of the colloidal particle dispersion.

The pretreatment composition further includes a solvent. This may be the solvent that the inorganic nanoparticles, which may be surface-functionalized nanoparticles, of the colloidal dispersion are initially dispersed in. The solvent may comprise water or aqueous liquids and/or non-aqueous liquids. In some embodiments, the solvent is an aqueous solvent that includes a mixture of water and alcohols. The alcohol solvent may be a $C_1$ to $C_6$ alcohol, such as methanol, ethanol, isopropyl alcohol, etc. The proportion of water to alcohol may range from 100:1 to 1:100 by weight. Organic solvents may also be used alone or in combination with water. Organic solvents may include alcohols, methyl ethyl ketone (MEK), methyl isobutyl ketone, toluene, xylene, cyclohexane, dimethyl acetamide, ethyl acetate, etc. Combinations of various solvents, aqueous and non-aqueous, may be used.

The solvents may be present in the pretreatment composition in an amount from 50 wt % or less by total weight of the pretreatment composition. In particular embodiments, the solvent is present in the treatment composition in an amount from at least, equal to, and/or between any two of 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.5 wt %, 6.0 wt %, 6.5 wt %, 7.5 wt %, 8.0 wt %, 8.5 wt %, 9.0 wt %, 9.5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, and 50 wt % by total weight of the treatment composition.

The pretreatment composition may also include a surfactant component. The surfactant may include an amphoteric surfactant, an ionic surfactant, an anionic surfactant, a cationic surfactant, a nonionic surfactant, or a combination of these. In particular embodiments, the surfactant is primarily an anionic surfactant with or without the use of a minor portion of non-ionic surfactants. Examples of suitable surfactants include, but are not limited to, ethoxylated nonyl phenol, sodium stearate, sodium dodecyl sulfate, sodium dodecylbenzene sulfonate, alkyl olefin sulfonates, laurylamine hydrochloride, trimethyldodecylammonium chloride, cetyl trimethylammonium chloride, polyethylene oxide alcohol, ethoxylated castor oil, propoxylated castor oil, ethoxylated-propoxylated castor oil, ethoxylated soybean oil, propoxylated soybean oil, ethoxylated-propoxylated soybean oil, ethylene oxide-propylene oxide copolymers, sodium trideceth sulfate, ethoxylated tetramethyl decyne alcohol, alkylphenolethoxylate, Polysorbate 80, ethoxylated or propoxylated polydimethylsiloxane, dodecyl betaine, lauramidopropyl betaine, cocamidopropyl betaine, cocamidopyropyl-2-hydroxypropyl sulfobetaine, alkyl aryl sulfonates, protein-surfactant complexes, fluorosurfactants, polyethyleneoxide alkyl ether phosphates, and combinations of these. In certain embodiments, the surfactant may be an ethylene oxide/propylene oxide copolymer, such as that available from AksoNobel as ETHYLAN 1206. An alkyl olefin sulfanate may also be used as the surfactant, such as that commercially available from Pilot Chemical as Calsoft® AOS-40. A suitable commercially available amphoteric surfactant is that available from Solvay as Mackam® CBS-50G.

The surfactants may be present in the pretreatment composition in an amount from 0.01 wt % to 50 wt % by total weight of the treatment composition, more particularly from 0.1 wt % to 10 wt %, and still more particularly from 0.5 wt % to 5 wt %. In certain embodiments, the surfactants may be present in the pretreatment composition in an amount of at least, equal to, and/or between any two of 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.5 wt %, 6.0 wt %, 6.5 wt %, 7.5 wt %, 8.0 wt %, 8.5 wt %, 9.0 wt %, 9.5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, and 50 wt % by total weight of the treatment composition.

The pretreatment composition further include glycols. The glycols may act as solvent as well as act as a drying agent. Examples of such materials include, but are not limited to, ethylene glycol, propylene glycol, triethylene glycol, ethylene glycol mono n-propyl ether, propylene glycol methyl ether acetate, etc., and combinations of these. In many applications, the glycols will be ethylene glycol and triethylene glycol.

The glycols may be present in the pretreatment composition in an amount from 50 wt % or less by total weight of the treatment composition. In particular embodiments, the glycols may be present in the pretreatment composition from 0.1 wt % to 50 wt %. In certain embodiments, the glycols may be present in the pretreatment composition in an amount of at least, equal to, and/or between any two of 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.5 wt %, 6.0 wt %, 6.5 wt %, 7.5 wt %, 8.0 wt %, 8.5 wt %, 9.0 wt %, 9.5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, and 50 wt % by total weight of the pretreatment composition.

The pretreatment composition may also include a terpene and/or a terpenoid. Terpenes are organic compounds that are typically derived biosynthetically from units of isoprene, which has the molecular formula $C_5H_8$. The basic molecular formula of terpenes are multiples of this (i.e., $(C_5H_8)_n$ where n is the number of linked isoprene units). The isoprene units may be linked together "head to tail" to form linear chains or they may be arranged to form rings. Terpenoids are like terpenes but typically contain additional functional groups, such as oxygen or OH groups. One common example of a terpene compound is limonene. Limonene is a cyclic terpene. The d-isomer version of limonene is d-limonene, which is commonly available. Less common is the l-isomer, i.e., l-limonene. These and other terpene and terpenoid compounds are commercially available.

The terpene and/or terpenoid compounds may be present in the pretreatment composition in an amount from 50 wt % or less by total weight of the pretreatment composition. In particular embodiments, the terpene and/or terpenoid compounds may be present in the pretreatment composition in an amount from 0 wt % to 50 wt %. In certain embodiments, the terpene and/or terpenoid compounds may be present in the pretreatment composition in an amount of at least, equal to, and/or between any two of 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.5 wt %, 6.0 wt %, 6.5 wt %, 7.5 wt %, 8.0 wt %, 8.5 wt %, 9.0 wt %, 9.5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, and 50 wt % by total weight of the pretreatment composition.

In certain embodiments, the pretreatment composition includes a non-terpene oil. An example of a suitable non-terpene oil is methyl soyate. Methyl soyate is a methyl ether derived from soybeans and methanol. The non-terpene oil may be present in the pretreatment composition in an amount from 50 wt % or less by total weight of the treatment composition. the non-terpene oil may be present in the treatment composition in an amount from 0 wt % to 50 wt %. In certain embodiments, the non-terpene oil may be present in the treatment composition in an amount of at least, equal to, and/or between any two of 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.5 wt %, 6.0 wt %, 6.5 wt %, 7.5 wt %, 8.0 wt %, 8.5 wt %, 9.0 wt %, 9.5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, and 50 wt % by total weight of the treatment composition.

The treatment composition may further include a bio- or bacteria-reducing agent and/or biocide. A "biocide" is a technical definition that is defined by the EPA. In some instances, a bio-reducing or bacteria-reducing agent that does not meet the EPA definition of a biocide may be used. The difference may be the result of the concentrations and/or materials used. One non-limiting example of a suitable bacteria-reducing agent is glutaraldehyde. The bio- or bacteria-reducing agent and/or biocide may be used in an amount from 0.01 wt % to 5 wt % by total weight of the pretreatment composition. In particular applications, the amount of bio- or bacteria-reducing agent and/or biocide may be at least, equal to, and/or between any two of 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, and 5.0 wt % by total weight of the pretreatment composition.

A pH adjusting agent may also be used in the pretreatment composition. These may be acidic or alkali materials used to lower or raise the pH of the treatment composition to a selected level. The pH of the treatment composition may vary (e.g., a pH from 6 to 8) depending upon the composition makeup, the pretreatment to be performed and the purpose or fluids transported through the pipeline. In certain applications, the pH of the treatment composition will range from 6 to 7.

In certain embodiments the pretreatment composition may be free of or contain less than 0.1 wt %, 0.01 wt %, or 0.001 wt % of any one or more of an iron chelator, tetrakis(hydroxymethyl)phosphonium chloride (THPC), tetrakis(hydroxymethyl)phosphonium sulfate (THPS), methanol, and/or ethanol. In the case of methanol, this may be avoided in those treatments used to pretreat pipelines for natural gas as it may mask the odors of mercaptans, which are used as odorants in natural gas to facilitate gas-leak detection.

In carrying out the pretreatment method for pretreating a pipeline, the treatment composition as has been described is introduced into an interior of a pipeline to be pretreated. Referring to FIG. 1, this will typically be at the upstream end of the pipeline segment 12, at or within the barrel portions 18, 20 of the pig launcher 14. The pretreatment composition may be introduced into the launcher through a port and valve formed for such purpose, or may be introduced into the opening of the barrel portion 18. The pretreatment composition may also be injected at one or more positions spaced apart along the length of the pipeline segment 12. Injection ports (not shown) may be provided along the length of the pipeline segment 12 for this purpose.

The pig 22, which represents a spreader pig for applying the pretreatment composition to the surfaces of the interior of the pipeline, is introduced into the launcher 14 and/or pipeline segment 12, with the pretreatment composition located downstream of the pig 22. The spreader pig 22 can then be launched down the pipeline segment 12 so that it spreads the pretreatment composition along the walls of the interior of the mainline pipe 30 of pipeline segment 12.

In particular embodiments, the volume amount of pretreatment composition used may be that selected to provide a particular thickness according to Equation 1. The thickness of the treatment composition may vary. In many applications the thickness of the pretreatment composition applied to the walls of the pretreated pipe may range from 0.1 mil or 10 mils or more. In particular embodiments, the pretreatment composition is applied to the walls of the pipe at a thickness at least, equal to, and/or between any two of 0.1 mil, 0.2 mil, 0.3 mil, 0.4 mil, 0.5 mil, 0.6 mil, 0.7 mil, 0.8 mil, 0.9 mil, 1.0 mil, 1.1 mils, 1.2 mils, 1.3 mils, 1.4 mils, 1.5 mils, 1.6 mils, 1.7 mils, 1.8 mils, 1.9 mils, 2.0 mils, 2.1 mils, 2.2 mils, 2.3 mils, 2.4 mils, 2.5 mils, 2.6 mils, 2.7 mils, 2.8 mils, 2.9 mils, 3.0 mils, 3.1 mils, 3.2 mils, 3.3 mils, 3.4 mils, 3.5 mils, 3.6 mils, 3.7 mils, 3.8 mils, 3.9 mils, 4.0 mils, 4.1 mils, 4.2 mils, 4.3 mils, 4.4 mils, 4.5 mils, 4.6 mils, 4.7 mils, 4.8 mils, 4.9 mils, 5.0 mils, 5.1 mils, 5.2 mils, 5.3 mils, 5.4 mils, 5.5 mils, 5.6 mils, 5.7 mils, 5.8 mils, 5.9 mils, 6.0 mils, 6.1 mils, 6.2 mils, 6.3 mils, 6.4 mils, 6.5 mils, 6.6 mils, 6.7 mils, 6.8 mils, 6.9 mils, 7.0 mils, 7.1 mils, 7.2 mils, 7.3 mils, 7.4 mils, 7.5 mils, 7.6 mils, 7.7 mils, 7.8 mils, 7.9 mils, 8.0 mils, 8.1 mils, 8.2 mils, 8.3 mils, 8.4 mils, 8.5 mils, 8.6 mils, 8.7 mils, 8.8 mils, 8.9 mils, 9.0 mils, 9.1 mils, 9.2 mils, 9.3 mils, 9.4 mils, 9.5 mils, 9.6 mils, 9.7 mils, 9.8 mils, 9.9 mils, and 10 mils.

As shown in FIG. 2, the pretreatment composition may be applied as a pill 70 before a single spreader pig 66. Alternatively, the pretreatment composition may be applied as a pill 78 between leading and trailing pigs 72, 74, as shown in FIG. 3. The passage of the pigs through the pipeline may result in both the application of treatment composition and removal of excess pretreatment composition simultaneously in certain instances.

The pretreatment composition is applied to the walls of the pipeline with one pig or body that does not facilitate the removal of the applied treatment composition and those materials adhering to the walls of the pipeline. The applied treatment composition may be allowed to reside upon the surfaces of the interior of the pipeline for a period of time after it is applied without conducting further fluids through the pipeline. The residence time that the treatment composition is allowed to reside on the walls of the pipeline after its application may range from 10 minutes or more. In many instances, the residence time may range from 10 minutes to several days, more particularly from 1 hr to 48 hrs, and still more particularly from 3 hrs to 24 hours. In particular embodiments, the treatment composition is allowed to reside on the walls of the pipeline before the pipeline is brought online for conducting fluids from at least, equal to, and/or between any two of 10 min, 20 min, 30 min, 40 min, 50 min, 1 hr, 2 hrs, 3 hrs, 4 hrs, 5 hrs, 6 hrs, 7 hrs, 8 hrs, 9 hrs, 10 hrs, 11 hrs, 12 hrs, 13 hrs, 14 hrs, 15 hrs, 16 hrs, 17 hrs, 18 hrs, 19 hrs, 20 hrs, 21 hrs, 22 hrs, 23 hrs, 24 hrs, 25 hrs, 26 hrs, 27 hrs, 28 hrs, 29 hrs, 30 hrs, 31 hrs, 32 hrs, 33 hrs, 34 hrs, 35 hrs, 36 hrs, 37 hrs, 38 hrs, 39 hrs, 40 hrs, 41 hrs, 42 hrs, 43 hrs, 44 hrs, 45 hrs, 46 hrs, 47 hrs, and 48 hrs.

The pretreatment composition incorporating the inorganic nanoparticles provides a pretreatment fluid that works to slicken the pipeline walls or reduce the friction between the walls of the pipeline and the fluids or materials conducted through the pipeline, thus reducing the pressure drop through the pipeline during its use. The pretreatment composition also aids in protecting and keeping deposits off the walls of the pipeline, as materials are less likely to stick to the pipeline surfaces. The inorganic nanoparticles are also those that exhibit properties of Brownian-motion. The Brownian-motion, diffusion-driven mechanism is known as disjoining pressure that helps in keeping deposits from forming on the walls of the pipeline.

Depending upon the pretreatment composition makeup, the nanoparticles themselves may be charged. For example, the inorganic nanoparticles may be charged nanoparticles and the colloidal particle dispersion may be an anionic or a cationic colloidal silica dispersion. In many instances, the inorganic nanoparticles are positively charged nanoparticles. This may result in the nanoparticles being attracted to the material of the pipeline, such as pipelines that are provided with cathodic corrosion protection. This attraction causes the nanoparticle materials to be drawn to and adhere to the walls of the pipeline so that they are retained thereon even as fluids or materials are conducted through the pipeline. The friction reducing and protective properties of the pretreatment composition are thus maintained on the walls of the pipeline during its use in transporting fluids and materials. This makes it more difficult for unwanted materials to adhere to the walls of the pipeline. The Brownian motion of the nanoparticles also facilitates loosening and breaking up of any unwanted deposits that may begin to form on the interior surfaces of the pipeline during its use.

In certain instances, the pretreatment process may be repeated wherein the same or a different pretreatment composition is applied to the interior surfaces of the pipeline. The amount of treatment composition applied during each cycle may be the same or vary from cycle to cycle.

One of the advantages of the pretreatment composition and method is that it may facilitate drying of water or moisture from the pipeline. While there can be some water used in the pretreatment composition, this water is not free water that will elevate the moisture content within the pipeline. This is because the water complexes with the other components (e.g., glycols) of the pretreatment composition. The drying agents further aid to absorb liquid water and vapor that is introduced into the pipeline so that the treatment facilitates drying of the pipeline. As a result, in certain instances, a drying pig may not be necessary after the pretreatment has been carried out. In other applications, a drying pig may be passed through the pipeline to remove any residual water moisture or liquids.

In some applications, a corrosion inhibitor may be applied to the interior surfaces of the pipeline after the pretreatment composition has been applied. Those corrosion inhibitors and application methods that are well known in the art may be used.

The pretreatment composition can also be used in pretreating without the use of a pig, as has been described. In such pretreatment operations, the introduced pretreatment composition may be carried by fluids flowing through the pipeline, such as high velocity gases (e.g., nitrogen, air, natural gas, etc.), which carry the treatment fluid along the length of the pipeline segment being treated. In such instances, the treatment composition may tend to adhere to the interior surfaces of the pipeline as a thin layer or film even without the use of a pig or body to spread the treatment composition. This may be due, at least in part, because of the colloidal silica dispersion being ionically charged. When the pipeline is provided with cathodic corrosion protection, this attracts the ionically charged colloidal silica dispersion of the treatment composition. The treatment composition can be tailored with a colloidal silica dispersion having appropriately charged nanoparticles that are attracted to the pipeline walls based upon the type of cathodic corrosion protection used for the pipeline.

Figure 4:
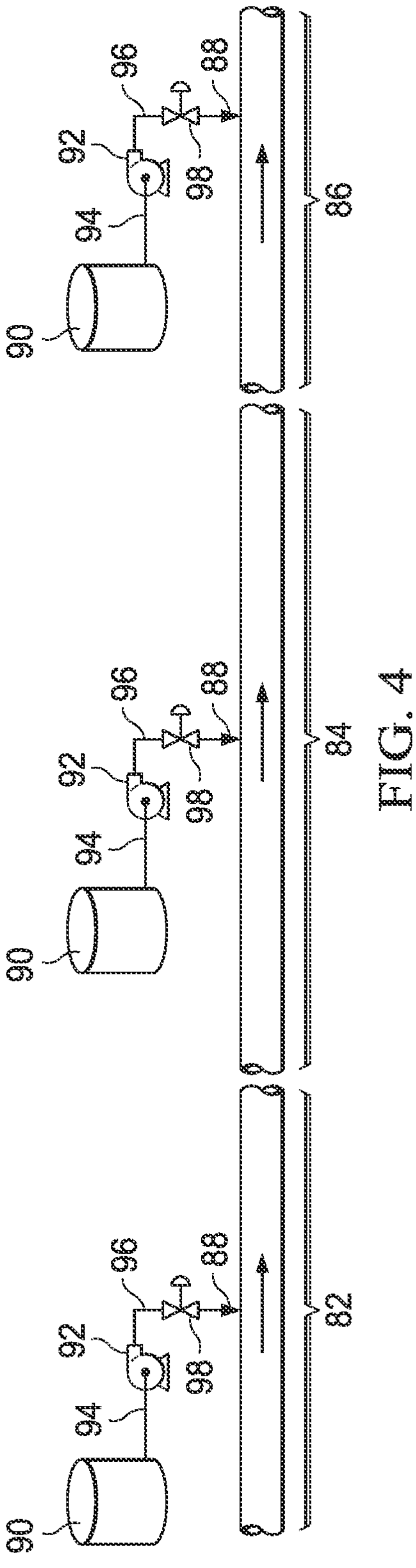
FIG. 4 is a schematic of various pipeline segments showing injection points for the injecting the pretreatment composition either as a batch amount or continuously over time in accordance with particular embodiments of the disclosure.

FIG. 4 shows a pipeline 80, such as those previously described, that can be pretreated in either a batch or bulk pretreatment operation and/or a continuous operation. The pipeline 80 to be treated may be divided along its length into different pipeline segments 82, 84, 86 of selected lengths. Each segment 82, 84, 86 is provided with at least one treatment composition injection point 88 at or near the upstream end of each segment where the pretreatment composition can be introduced into the interior of the pipeline 80. Such injection points can be any device or apparatus provided on the pipeline for introducing materials into the interior of the pipeline from the exterior of the pipeline. This may include, but is not limited to, an olet-type fitting (e.g., weldolet, etc.) provided on the pipeline wall. Such injection points are typically located at surface locations so that they can be readily accessed.

The injection point 88 where the pretreatment composition is injected for each pipeline segment may be spaced from the next adjacent injection point (upstream or downstream) a distance from 1 inch to 100 miles or more. In particular embodiments, the injection points 88 may be spaced from the next adjacent injection point a distance from 50 yards or 100 yards to 100 miles, more particularly from 1 mile to 50 miles, and still more particularly from 5 miles to 20 miles. In particular embodiments, the injection point 88 may be used for pretreating a length of pipeline or be spaced apart along the length of the pipeline being treated a length or distance from at least, equal to, and/or between any two of 1 inch, 1 foot, 1 yard, 50 yards, 100 yards, 1 mile, 2 miles, 3 miles, 4 miles, 5 miles, 6 miles, 7 miles, 8 miles, 9 miles, 10 miles, 11 miles, 12 miles, 13 miles, 14 miles, 15 miles, 16 miles, 17 miles, 18 miles, 19 miles, 20 miles, 21 miles, 22 miles, 23 miles, 24 miles, 25 miles, 26 miles, 27 miles, 28 miles, 29 miles, 30 miles, 31 miles, 32 miles, 33 miles, 34 miles, 35 miles, 36 miles, 37 miles, 38 miles, 39 miles, 40 miles, 41 miles, 42 miles, 43 miles, 44 miles, 45 miles, 46 miles, 47 miles, 48 miles 49, 50 miles, 60 miles, 70 miles, 80 miles, 90 miles, and 100 miles.

At each injection point 88, a supply of the pretreatment composition is provided. This may be pretreatment composition stored in a storage vessel 90, which may be a stationary storage tank that is located nearby the injection point. The storage vessel 90 may also be a temporary or mobile storage tank mounted on a truck or other vehicle, such as on a truck bed or trailer, which can be transported to the injection point during pretreatment operations and removed thereafter. In certain embodiments, a separate storage tank 90 may be provided for each injection point.

One or more pumps 92, which may be high pressure pumps, are used to deliver the pretreatment composition to the injection point 88 through lines or hoses 94, 96. These may be stationary pumps that are permanently associated with and located nearby each stationary storage tank 90 or may be provided on or with the truck or vehicle in those cases where the storage tank is a mobile storage tank. The pumps 92 may be those pumps powered by electricity, solar, wind, gasoline, diesel, natural gas, etc.

One or more valves 98 are provided to control the flow of pretreatment composition from the storage tank 90 to the injection point 88. The valve or valves 98 may be ball valves or other suitable valves, which may include one or more metering valves to control the rate of flow of the pretreatment composition to the injection point. A control unit (not shown) to control the operation and actuation of the pump 92 and/or valves 98 may be programed or be locally or remotely operated to provide the desired flow of pretreatment composition to the injection point.

Figure 5:
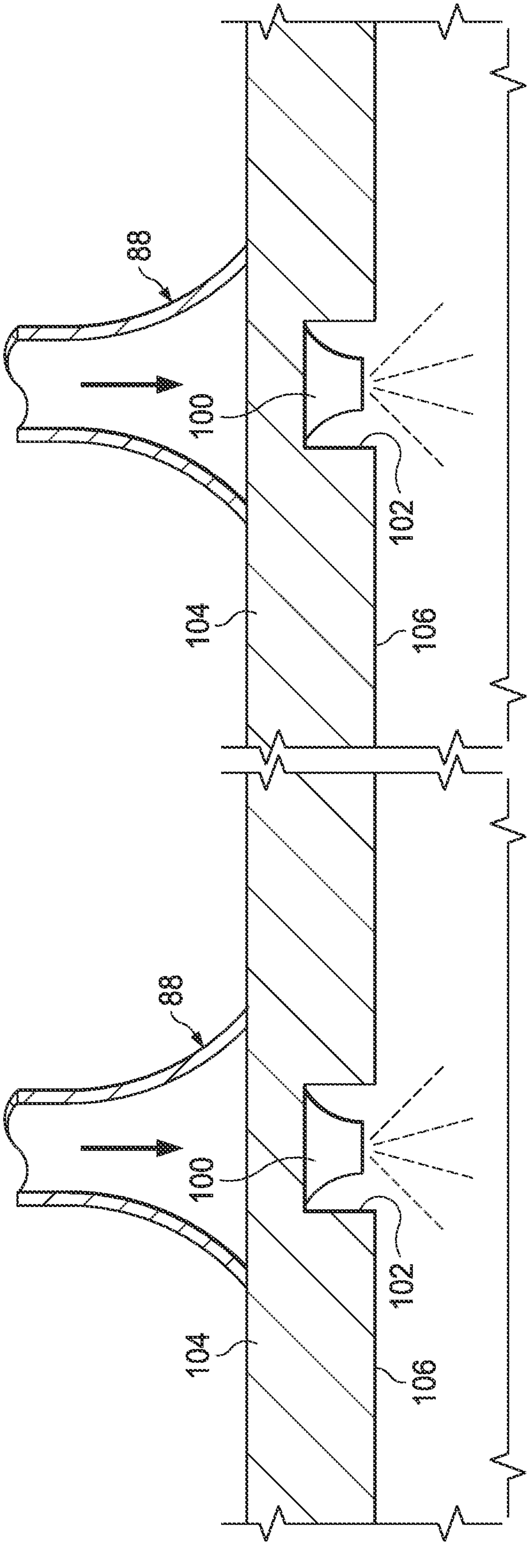
FIG. 5 is cross-sectional view of a pipeline wall showing spray nozzles recessed within the wall of the pipeline for introducing atomized pretreatment composition into the interior of the pipeline.

Referring to FIG. 5, in introducing the pretreatment composition at the injection point 88, one or more injection nozzles 100 may be provided at each injection point 88. The nozzles 100 may be configured to provide an atomized spray or a selected spray configuration within the interior of the pipeline. This may be an atomized spray in some applications. In other embodiments, the pretreatment composition may be injected at the injection point 88 without any spray nozzle or nozzles.

In cases were nozzles 100 are used, these may be recessed from the interior surfaces of the pipeline. As shown in FIG. 5, a recessed area 102 is provided in the pipeline wall 104 so that the tip or end of the nozzle 100 does not project past or is just flush with the interior surface 106 of the pipeline wall 104. This prevents the nozzles 100 from interfering with any pigs or bodies that are passed through the interior of the pipeline, such as during subsequent cleaning operations.

In one pretreatment method, the pretreatment composition is introduced in a batch operation wherein a bulk amount of the pretreatment composition in a selected volume is introduced all at one time into the interior of the pipeline at each of the injection points 88. If there are long periods between batch treatments, it may not be practical to have a dedicated stationary storage tank for supplying the pretreatment composition to the injection points. In the bulk or batch treatments, the storage vessels 90 may therefore be provided on mobile storage vessels that are mounted on trucks or trailers or other vehicles that can be transported to the injection point locations located along the pipeline.

In the bulk or batch treatment, the desired volume of pretreatment composition is rapidly injected through the injection points. The lines, pumps, valves, etc., may be configured for the rapid introduction of the pretreatment composition into the pipeline, including high pressure pumps and lines (e.g., 1-inch high-pressure hoses). In some operations, the pretreatment composition may be introduced sequentially in different batch operations at each of the spaced apart injection points 88. This may be sequentially upstream or downstream. In other instances, the batch pretreatments at each injection point 99 may be carried out simultaneously or within short time from one another along the length of the pipeline being pretreated.

When the pretreatment composition is introduced in bulk or in a batch operation, the bulk volume of pretreatment composition may be introduced into the pipeline as a pill or bolus, with all of the pretreatment fluid for treating the pipeline segment being delivered within the pipeline in short period of time. This may range from 1 min to 24 hrs, more particularly from 15 min to 12 hrs, and still more particularly from 30 min to 8 hrs. In certain embodiments, the pill or bolus of fluid in the bulk or batch operation may be introduced in at least, equal to, and/or between any two of 1 min, 5 min, 10 min, 20 min, 30 min, 40 min, 50 min, 1 hr, 2 hrs, 3 hrs, 4 hrs, 5 hrs, 6 hrs, 7 hrs, 8 hrs, 9 hrs, 10 hrs, 11 hrs, 12 hrs, 13 hrs, 14 hrs, 15 hrs, 16 hrs, 17 hrs, 18 hrs, 19 hrs, 20 hrs, 21 hrs, 22 hrs, 23 hrs, and 24 hrs. Such bulk or batch treatments may be repeated or carried out periodically, during the pretreatment process. Because the pretreatment composition may be the same or similar to that used for cleaning pipelines, such as described in U.S. Pat. No. 11,512,241, the introduction of the pretreatment composition and any subsequent cleaning treatment composition can be carried out at different intervals, even after the initial pretreatment, such as once a day, once every few days (e.g., from 2 to 7 days), once a week, once every few weeks, once a month, once every few months (e.g., from 2 to 12 months), once a year, once every two years or longer, etc.

The amount of pretreatment composition introduced into each injection point for a given segment of pipeline being pretreated during the batch or bulk treatment operation may be introduced in a selected bulk treatment volume $V_t$ according to Equation 2 below:

$$V_t=\pi\cdot[(R^2-(R-T)^2]\cdot L \quad (2)$$

where R is the internal radius of the pipe being treated, T is from 0.1 mil to 10 mils, and L is the length of the pipeline segment being treated.

This volume $V_t$ generally corresponds to or is equivalent to the volume of pretreatment composition that would theoretically be applied to the walls of the pretreated pipe segment in a uniform layer along the length of the pipe segment. In certain embodiments, the value of T in Equation 2 may range from 0.1 mil to 10 mils or more. In particular applications, the value T may be at least, equal to, and/or between any two of 0.1 mil, 0.2 mil, 0.3 mil, 0.4 mil, 0.5 mil, 0.6 mil, 0.7 mil, 0.8 mil, 0.9 mil, 1.0 mil, 1.1 mils, 1.2 mils, 1.3 mils, 1.4 mils, 1.5 mils, 1.6 mils, 1.7 mils, 1.8 mils, 1.9 mils, 2.0 mils, 2.1 mils, 2.2 mils, 2.3 mils, 2.4 mils, 2.5 mils, 2.6 mils, 2.7 mils, 2.8 mils, 2.9 mils, 3.0 mils, 3.1 mils, 3.2 mils, 3.3 mils, 3.4 mils, 3.5 mils, 3.6 mils, 3.7 mils, 3.8 mils, 3.9 mils, 4.0 mils, 4.1 mils, 4.2 mils, 4.3 mils, 4.4 mils, 4.5 mils, 4.6 mils, 4.7 mils, 4.8 mils, 4.9 mils, 5.0 mils, 5.1 mils, 5.2 mils, 5.3 mils, 5.4 mils, 5.5 mils, 5.6 mils, 5.7 mils, 5.8 mils, 5.9 mils, 6.0 mils, 6.1 mils, 6.2 mils, 6.3 mils, 6.4 mils, 6.5 mils, 6.6 mils, 6.7 mils, 6.8 mils, 6.9 mils, 7.0 mils, 7.1 mils, 7.2 mils, 7.3 mils, 7.4 mils, 7.5 mils, 7.6 mils, 7.7 mils, 7.8 mils, 7.9 mils, 8.0 mils, 8.1 mils, 8.2 mils, 8.3 mils, 8.4 mils, 8.5 mils, 8.6 mils, 8.7 mils, 8.8 mils, 8.9 mils, 9.0 mils, 9.1 mils, 9.2 mils, 9.3 mils, 9.4 mils, 9.5 mils, 9.6 mils, 9.7 mils, 9.8 mils, 9.9 mils, and 10 mils.

The pretreatment composition itself for the batch or bulk pipeline pretreatment operation may be the same or similar to those pretreatment compositions used in conjunction with pigging operations, previously described. Such pretreatment composition is that containing the colloidal particle dispersion, which may be ionic dispersions, having inorganic nanoparticles with an average particle size from 500 nm or less, along with any additives, which have been described previously in conjunction with the pigging operations.

The introduced pretreatment composition incorporating the inorganic nanoparticles helps to slicken or reduce the friction of the walls of the pipeline so that there is less pressure drop of the fluids flowing within the pipeline. This reduced friction also helps prevent materials from adhering to the pipeline. Undesirable deposits are also prevented from forming on the interior surface of the pipeline by Brownian-motion, diffusion-driven mechanism of the inorganic nanoparticles. The colloidal silica dispersion may be ionic to facilitate adherence of the nanoparticles to the pipeline walls. When such charged nanoparticles of the ionic dispersion are used in pipelines that are provided with or configured to undergo cathodic corrosion protection, they are attracted to the walls of the pipeline when such cathodic corrosion protection is applied to the pipeline or components thereof.

At the end of the bulk or batch pretreatment and prior to repeating a further bulk treatment, one or more pigging operations may be performed, with or without the introduction of additional pretreatment composition. This may be done to remove excess pretreatment composition. One of the advantages of using the batch or bulk pretreatment operation is that when a cleaning operation employing a pig is later performed after a batch pretreatment, less cleaning treatment composition may need to be used during the pigging operation. Thus, for example, without the batch pretreatment operation, when a pig cleaning operation is performed, the cleaning treatment composition may be applied at a thickness of 5 mils. When the batch pretreatment is utilized prior to any subsequent pig cleaning operation, the subsequent cleaning treatment composition may be applied at a thickness of only 1 mil during the subsequent pig cleaning to provide the same results or to remove the same amount of materials from the pipeline.

In other applications, the pretreatment composition can also be used in treating and maintaining pipelines by continuously introducing the treatment composition at a selected rate into the interior of the interior of the pipeline for a period of time. In such operations, the pretreatment composition is introduced into the pipeline without the use of a pig or body that is passed through the pipeline to apply the treatment composition to the interior surfaces of the pipeline.

In such continuous pretreatment operation, the same or a similar configuration of the pipeline 80 shown in FIG. 4, as previously described for the batch operation, may be used. In the continuous operation, the storage tanks or vessels 90 may be stationary vessels since the pretreatment fluid is introduced continuously over a period of time. This may be from two months, six weeks, four weeks, three weeks, two weeks, one week, 6 days, 5 days, 4 days, 3 days, 2 days to greater than 24 hours. The spacing of the injection points may also be the same. The pumps 92 and/or valves 98, which may be metering valves, are used to introduce the treatment composition at a given rate.

As used herein, the term "continuous" or similar designations with respect to the continuous pretreatment operation is meant to encompass the continuous, uninterrupted fluid flow where the fluid flows continuously without interruption or being stopped. The continuous, uninterrupted fluid flow may be at a constant or a variable flow rate. The term "continuous" or similar designations in reference to continuous treatment operation, unless expressly stated otherwise, is also meant to encompass the fluid flow that may be temporarily interrupted or stopped for a period of time, but that provides an overall fluid flow at a selected rate over time. Thus, for example, the pump 92 may be operated and/or valve 98 may be actuated to periodically introduce a slug or flow of fluid of a selected volume every 5 minutes, with 12 slugs of fluid being introduced every hour. This will provide a desired amount or volume of treatment fluid being delivered and introduced into the interior of the pipeline every hour so that, while not technically continuous, uninterrupted flow, the pretreatment fluid is still provided at the desired rate of flow over one hour so that it is essentially continuous.

In the continuous pretreatment operation, the pretreatment composition may be introduced at each of the injection points 88 simultaneously or substantially simultaneously or within a short time from one another, so that the entire pipeline is generally treated at the same time. In other embodiments, the continuous pretreatment operation may be carried out at each injection point sequentially upstream or downstream.

When continuously introducing the pretreatment composition, the pretreatment fluid may be introduced at a selected flow rate Q according to Equation 3 below.

$$Q=1.389E-3\cdot\pi\cdot[(R^2-(R-T)^2]\cdot L/\text{hr} \quad (3)$$

where R is the internal radius of the pipe being treated, T is from 0.05 mil to 10 mils, and L is the length of the pipeline segment being treated.

In certain embodiments, the value of T in Equation 3 may range from 0.05 mil to 10 mils or more. The value of T is the thickness that would theoretically be applied to the walls of the treated pipe segment in a uniform layer along the length of the pipe segment if it was introduced and applied all at one time. In particular applications, the value T may be at least, equal to, and/or between any two of 0.05 mils, 0.06 mils, 0.07 mils, 0.08 mils, 0.09 mils, 0.1 mil, 0.2 mil, 0.3 mil, 0.4 mil, 0.5 mil, 0.6 mil, 0.7 mil, 0.8 mil, 0.9 mil, 1.0 mil, 1.1 mils, 1.2 mils, 1.3 mils, 1.4 mils, 1.5 mils, 1.6 mils, 1.7 mils, 1.8 mils, 1.9 mils, 2.0 mils, 2.1 mils, 2.2 mils, 2.3 mils, 2.4 mils, 2.5 mils, 2.6 mils, 2.7 mils, 2.8 mils, 2.9 mils, 3.0 mils, 3.1 mils, 3.2 mils, 3.3 mils, 3.4 mils, 3.5 mils, 3.6 mils, 3.7 mils, 3.8 mils, 3.9 mils, 4.0 mils, 4.1 mils, 4.2 mils, 4.3 mils, 4.4 mils, 4.5 mils, 4.6 mils, 4.7 mils, 4.8 mils, 4.9 mils, 5.0 mils, 5.1 mils, 5.2 mils, 5.3 mils, 5.4 mils, 5.5 mils, 5.6 mils, 5.7 mils, 5.8 mils, 5.9 mils, 6.0 mils, 6.1 mils, 6.2 mils, 6.3 mils, 6.4 mils, 6.5 mils, 6.6 mils, 6.7 mils, 6.8 mils, 6.9 mils, 7.0 mils, 7.1 mils, 7.2 mils, 7.3 mils, 7.4 mils, 7.5 mils, 7.6 mils, 7.7 mils, 7.8 mils, 7.9 mils, 8.0 mils, 8.1 mils, 8.2 mils, 8.3 mils, 8.4 mils, 8.5 mils, 8.6 mils, 8.7 mils, 8.8 mils, 8.9 mils, 9.0 mils, 9.1 mils, 9.2 mils, 9.3 mils, 9.4 mils, 9.5 mils, 9.6 mils, 9.7 mils, 9.8 mils, 9.9 mils, and 10 mils.

During the continuous pretreatment operation, the pretreatment composition is continuously introduced at the selected rate Q over a period from 1 hr to 1000 hrs or more, more particularly from 24 hours to 700 hours. In particular embodiments, the pretreatment composition is continuously introduced over a period of at least, equal to, and/or between any two of 1 hr, 2 hrs, 3 hrs, 4 hrs, 5 hrs, 6 hrs, 7 hrs, 8 hrs, 9 hrs, 10 hrs, 11 hrs, 12 hrs, 13 hrs, 14 hrs, 15 hrs, 16 hrs, 17 hrs, 18 hrs, 19 hrs, 20 hrs, 21 hrs, 22 hrs, 23 hrs, 24 hrs, 24 hrs, 25 hrs, 26 hrs, 27 hrs, 28 hrs, 29 hrs, 30 hrs, 31 hrs, 32 hrs, 33 hrs, 34 hrs, 35 hrs, 36 hrs, 37 hrs, 38 hrs, 39 hrs, 40 hrs, 41 hrs, 42 hrs, 43 hrs, 44 hrs, 45 hrs, 46 hrs, 47 hrs, 48 hrs, 49 hrs, 50 hrs, 51 hrs, 52 hrs, 53 hrs, 54 hrs, 55 hrs, 56 hrs, 57 hrs, 58 hrs, 59 hrs, 60 hrs, 61 hrs, 62 hrs, 63 hrs, 64 hrs, 65 hrs, 66 hrs, 67 hrs, 68 hrs, 69 hrs, 70 hrs, 71 hrs, 72 hrs, 73 hrs, 74 hrs, 75 hrs, 76 hrs, 77 hrs, 78 hrs, 79 hrs, 80 hrs, 81 hrs, 82 hrs, 83 hrs, 84 hrs, 85 hrs, 86 hrs, 87 hrs, 88 hrs, 89 hrs, 90 hrs, 91 hrs, 92 hrs, 93 hrs, 94 hrs, 95 hrs, 96 hrs, 97 hrs, 98 hrs, 99 hrs, 100 hrs, 110 hrs, 120 hrs, 130 hrs, 140 hrs, 150 hrs, 160 hrs, 170 hrs, 180 hrs, 190 hrs, 200 hrs, 210 hrs, 230 hrs, 240 hrs, 250 hrs, 260 hrs, 270 hrs, 280 hrs, 290 hrs, 300 hrs, 310 hrs, 320 hrs, 330 hrs, 340 hrs, 350 hrs, 360 hrs, 370 hrs, 380 hrs, 390 hrs, 400 hrs, 410 hrs, 420 hrs, 430 hrs, 440 hrs, 450 hrs, 460 hrs, 470 hrs, 480 hrs, 490 hrs, 500 hrs, 510 hrs, 520 hrs, 530 hrs, 540 hrs, 550 hrs, 560 hrs, 570 hrs, 580 hrs, 590 hrs, 600 hrs, 610 hrs, 620 hrs, 630 hrs, 640 hrs, 650 hrs, 660 hrs, 670 hrs, 680 hrs, 690 hrs, 700 hrs, 710 hrs, 720 hrs, 730 hrs, 740 hrs, 750 hrs, 760 hrs, 770 hrs, 780 hrs, 790 hrs, 800 hrs, 810 hrs, 820 hrs, 830 hrs, 840 hrs, 850 hrs, 860 hrs, 870 hrs, 880 hrs, 890 hrs, 900 hrs, 910 hrs, 920 hrs, 930 hrs, 940 hrs, 950 hrs, 960 hrs, 970 hrs, 980 hrs, 990 hrs, and 1000 hrs.

The pretreatment composition used for the continuous pretreatment operation may be the same as that used for the pigging and batch operations, previously described, which can be considered a concentrated pretreatment composition. In most instances, however, the pretreatment composition used for the continuous pretreatment operation is diluted with water so that it is thinner or less viscous. Thus, for the pretreatment compositions previously described for use in conjunction with the pigging and batch treatment operations, these may be diluted with water in an amount from 1 wt % to 99 wt % by weight of the concentrated pretreatment composition, more particularly the water may be added in an amount from 5 wt % to 90 wt % by weight of the concentrated pretreatment composition, and still more particularly the water may be added in an amount from 25 wt % to 50 wt % by weight of the concentrated pretreatment composition. In particular applications, the pretreatment composition for the continuous pretreatment operation may be diluted with water in an amount of at least, equal to, and/or between any two of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, and 99 wt % by weight of the concentrated pretreatment composition.

The less viscous pretreatment composition for the continuous pretreatment allows the pretreatment composition to be introduced through pumps and conduits, including high pressure pumps and lines (e.g., ⅜- to ½-inch high-pressure hoses) into the pipeline as an atomized liquid, such as through the atomizer nozzles 100 of FIG. 5. The addition of water also helps in delaying the drying time of the pretreatment composition within the interior of the pipeline. This helps in situations where a high-pressure, dry-gas is being conducted through the pipelines during the pretreatment where the gas has a very low dew point and is moving at a very high velocity. Without the additional water, the pretreatment composition can dry out before it reaches the end of the pipe segment being treated. The additional water also facilitates the wetting of the pretreatment composition on the interior walls of the pipeline so that there is sufficient moisture or liquid to allow the nanoparticles to act within the liquid layer to adhere to the interior surfaces of the pipeline.

At the end of the continuous pretreatment operation, one or more pigging operations may be performed, with or without the introduction of additional pretreatment composition. This removes excess pretreatment composition adhering to the surfaces of the interior of the pipeline. Like the batch pretreatment, one of the advantages of using the continuous pretreatment operation is that when a cleaning operation employing a pig is later performed after the continuous pretreatment, less cleaning treatment composition may need to be used during the pigging operation. Thus, for example, without the continuous pretreatment operation, when a pig cleaning operation is performed, the cleaning treatment composition may be applied at a thickness of 5 mils. When the continuous pretreatment is utilized prior to any subsequent pig cleaning operation, the cleaning treatment composition may be applied at a thickness of only 1 mil with the pig to provide the same results or to remove the same amount of materials from the pipeline.

Because the pretreatment composition may be the same or similar to that used for cleaning pipelines, such as described in U.S. Pat. No. 11,512,241, the continuous introduction of the pretreatment composition can be followed by the continuous introduction of a cleaning treatment composition as the pipeline continues operation beyond two or more months.

One of the advantages of the continuous pretreatment operation, where the pretreatment composition is introduced over long periods of time at selected rates, is that the volume of liquid introduced into the pipeline can be controlled so that the liquid pretreatment composition does not overwhelm separation equipment (not shown) that may be associated with the pipeline. Separation equipment is often provided on gas pipelines in conjunction with compressor units (not shown) provided along the pipeline to pressurize the transported gas as it flows through the pipeline. The separation equipment separates the gases from any liquids in the pipeline before the gas is introduced into the compressor, where the liquids would otherwise damage the compressor. By reducing the flow of liquids in the continuous pretreatment operation so that they are introduced over time and not in a large bulk, the liquids do not exceed the capacity of the separation equipment and the separation equipment is not overwhelmed and can sufficiently separate the liquids of the pretreatment composition prior to delivering gas to the compressor.

The batch and continuous pretreatments can be each be carried out multiple times and in combination, wherein a batch pretreatment may be followed by a continuous pretreatment or vice versa. Alternating pretreatments may also be carried out. Furthermore, each pretreatment operation or multiple pretreatment operations may be followed with one or more pig cleaning operations, with or without further the use of pretreatment composition. In such cases, where the use of pretreatment composition is used in the pig operation, the same or a reduced amount of the pretreatment composition may be used had no previous batch or continuous pretreatment operation been performed.

The pretreatment methods and compositions in both the batch and continuous operations help in reducing friction in the pipeline and in protecting the pipeline from forming unwanted deposits. The reduction in friction as well as the Brownian motion properties of the inorganic nanoparticles also reduces the buildup of surface deposits on the interior surfaces of the pipeline. Moreover, valves, filters, and other equipment commonly employed in pipelines often become fouled or clogged with particulates and other debris. The pretreating methods and compositions may have the ability to reduce or eliminate this fouling and clogging. The pretreatments also aid in dehydrating or reducing the dew point in the pipeline. While there can be some water used in the pretreatment composition, this water is not free water that will elevate the moisture content within the pipeline. This is because the water complexes with the other components (e.g., glycols) of the pretreatment composition. The drying agent additives in the pretreatment composition further aid to absorb existing liquid water and vapor in the pipeline so that the pretreatment facilitates drying of the pipeline. The layer or film of the pretreatment composition on the interior walls of the pipeline conditions them, protecting them and preventing bacteria colony formation. Corrosion inhibitors in the pretreatment composition also help to prevent corrosion in the pipeline. The pretreatment composition also has no or very little effect on mercaptans or odorants that may be contained in the gases conducted through the pipeline so that there is no odorant fade as a result of the pretreatments.

In some embodiments of the disclosure, the pretreatment with the composition is carried out before assembly, installation or construction of the pipeline. In such applications, one or more or all of the components of the pipeline may be pretreated with the composition prior to their assembly, installation or construction. This may be done offsite or away from the site where the pipeline is being assembled, installed or constructed. In some instances, the pretreatment may be carried out at a surface location, with some or all of the components of the pipeline being subsequently buried beneath the earth or submerged in water during its installation and construction. This may be in addition to any subsequent treatments made after the installation and construction.

In many instances, the colloidal particle dispersion will be that having inorganic nanoparticles that are positively charged nanoparticles. Moreover, the components of the pipeline pretreated with such composition are those that are configured to or intended to undergo cathodic corrosion protection. These are metal materials, such as iron, cast iron, steel, carbon steel, mild or low carbon steel, cast iron, stainless steel, aluminum, copper, metal alloys, galvanized steel, etc. Most large industrial or commercial pipelines are configured to undergo or are provided with cathodic corrosion protection upon their installation and use. Thus, when the components of the apparatus or system that are pretreated with the colloidal particle dispersion with such positively charged nanoparticles undergo cathodic protection, a layer of the colloidal particle dispersion is coated thereon and the positively charged nanoparticles in such coating are drawn to the surfaces of the treated component so that they will tend to adhere to the treated surfaces.

Such cathodic protection of pipelines and/or various apparatuses and system components discussed herein typically involves galvanic or sacrificial anode protection, impressed current cathodic protection (ICCP), or a combination of these. In galvanic or sacrificial anode protection, one or more anodes formed from a metal (e.g., aluminum, magnesium, or zinc) that is more reactive than the metal being protected is provided so that it preferentially corrodes to prevent corrosion on the metal it is intended to protect. The sacrificial anode is mechanically coupled to the component, such as by welding, bolting, clamping, etc., so that the anode is in direct contact with the structure of the component being protected to ensure electrical conductivity between the protected component and the anode.

With ICCP, the component being protected is not in direct contact with the anode but is isolated from the anode. In ICCP, the anode may be formed from materials such as graphite, mixed metal oxide (MMO) coated titanium, or platinum-coated titanium. These are electrically isolated from the structure or component and installed nearby, such as in a surrounding electrolyte (soil, water, etc.). The anode is electrically coupled to the component being protected through wiring or electric cables that are mechanically and electrically coupled to the component being protected. An intervening power supply (e.g., a rectifier) between the component and the anode provides a protective electric potential at the structure's or component's surface, thus inhibiting its corrosion.

In some applications, pretreatment with the colloidal particle dispersion may be carried out while the pipeline component temporarily undergoes cathodic protection or is subjected to an electrical current as part of the pretreatment process. The component may undergo sacrificial or ICCP cathodic protection or otherwise be subjected to an electrical current during the pretreatment process to facilitate attracting the positively charged nanoparticles to the component's surfaces during the pretreatment. This may be done offsite or away from the final assembly, installation or construction site of the pipeline. Thereafter, this cathodic protection or electrical current may be suspended after the pretreatment has been completed and reapplied after or during the assembly, installation, construction or operation of the pipeline as it would be normally be used.

In addition to pretreating pipes and pipelines and components thereof, the pretreatment compositions can be used for pretreating various other apparatuses. As used herein, the term "apparatus" and variations of this term is meant to refer to those objects, equipment, devices, components, etc., that are fabricated, man-made and/or constructed for use from various materials. Unless expressly stated otherwise, the term "apparatus" is to be distinguished from and exclude naturally occurring or terranean objects, such as earthen, soil or rock formations, including subterranean formations and fractures that may have been formed in such formations, such as those for the production and extraction of hydrocarbons in oil and gas wells. The apparatuses may be formed from metal or non-metal materials or a combination of metal and non-metal materials. Non-limiting examples of metal materials may include iron, cast iron, steel, carbon steel, mild or low carbon steel, cast iron, stainless steel, aluminum, copper, metal alloys, galvanized steel, etc. Non-limiting examples of non-metal materials may include clay, glass, ceramics, concrete, brick, refractory materials, plastic or polymeric materials, PVC, polypropylene, polyethylene, fiberglass, composites, etc.

In particular, the apparatuses may be those that come into contact with fluids (liquid and/or gas) or other materials and that are subject to surface deposits from contact with such fluids. This may be from fluid flow through the apparatus or on the surfaces of the apparatus or the residence or storage of the fluid in the apparatus. In the pretreatment method, such apparatuses are also fresh or fresh-like so that they are essentially bare or substantially bare, without residues or any significant residues or buildup that might otherwise be formed on the surfaces of the apparatuses from coming into contact with such fluids or materials. These are typically apparatuses that are used for storing, handling, treating, conducting or reacting the fluids or materials, although they may be other apparatuses. The apparatuses may be mobile or stationary. Typically, these will be apparatuses used in surface applications (i.e., above ground) and/or apparatuses that may be buried only a few feet (i.e., 100 feet or less) below ground. Non-limiting examples of such apparatuses include various man-made bodies, man-made structures, tanks, storage tanks, vessels, storage vessels, mixing vessels, containers, valves, pipes, fittings, aquatic vessels (e.g., ships, boats, etc.), reactors, combustors, refrigeration units, cooling units, heat exchangers, boilers, radiators, separators, evaporators, pumps, compressors, towers, columns, cooling towers, filters, filtration units, slug catchers, Joule Thomson (JT) systems, cracking units, pyrolysis units, refining units, coalescers, dehydrators, amine units, amine treatment systems, chemical processing systems, food processing systems, gas processing systems, petroleum processing systems, biomatter processing systems, and water processing systems. The pretreated apparatuses may include the pipes, lines, valves, etc., such as those that are typically employed and/or associated with such apparatuses. These are all apparatuses that have surfaces that are exposed to, subjected to or submerged or partially submerged in various fluids (liquids and/or gases) that come into contact with such surfaces that result in deposits being formed on the surfaces from such contact. In certain applications, the apparatuses may be non-pipeline apparatuses.

The various apparatuses and systems are typically large industrial or commercial apparatuses or systems that may be used for storing, treating, conducting or otherwise processing large volumes of fluids. This may include hundreds, thousands, tens of thousands, hundreds of thousands, millions, tens of millions or more of gallons of liquids and/or cubic feet of gas per hour, day, days, weeks, months, etc. Such large industrial or commercial apparatuses are typically configured to undergo or are provided with cathodic corrosion protection, as discussed previously, upon their installation and use. The apparatuses and systems that may be pretreated are not limited to such large industrial or commercial apparatuses or systems, however.

Figure 6:
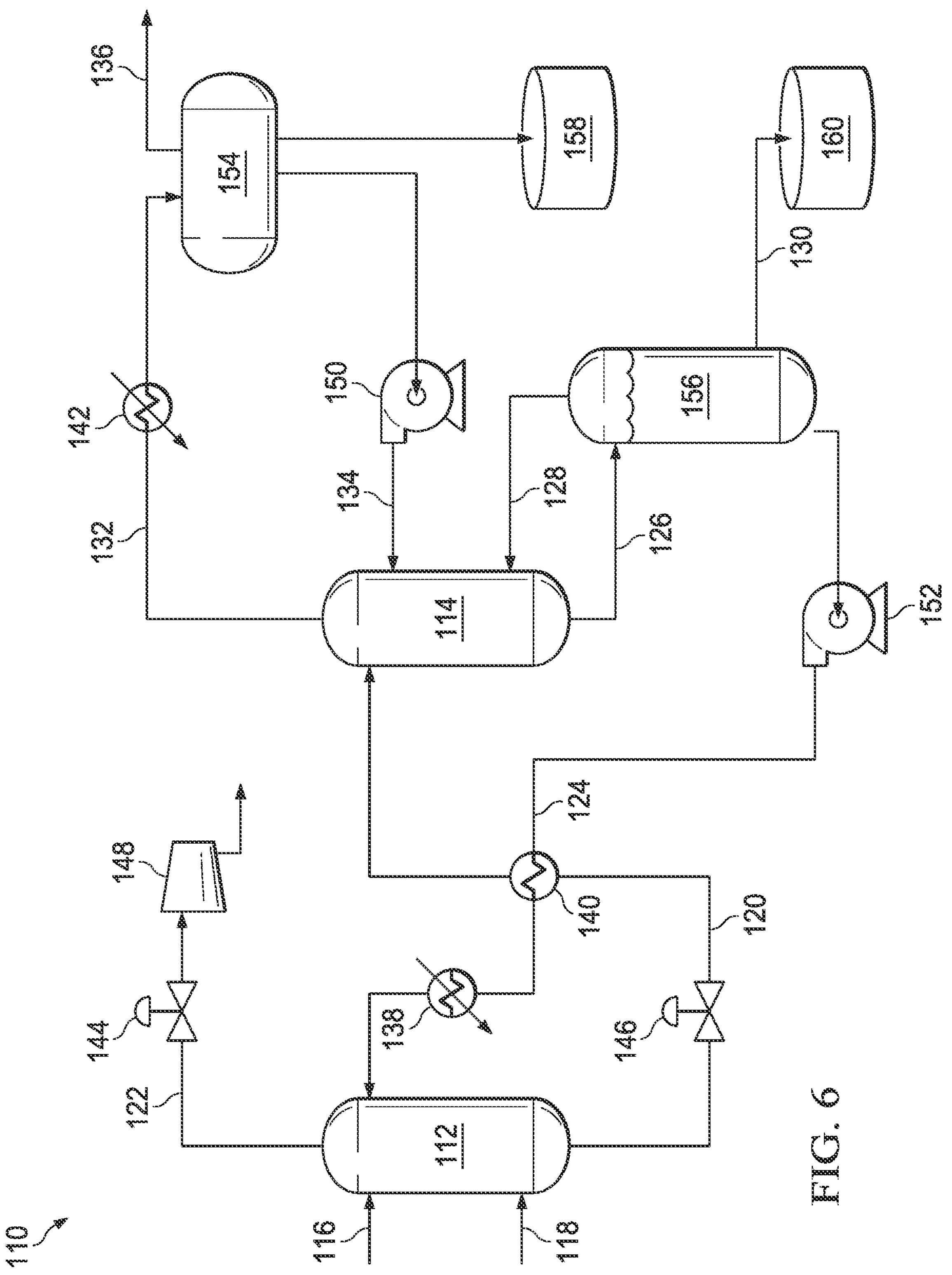
FIG. 6 is a schematic of a hypothetical processing system that employs various exemplary apparatuses for processing, treating or storing various fluids that may form surface deposits on the apparatuses that may be treated with a treatment composition in accordance with certain embodiments of the disclosure.

Referring to FIG. 6, a hypothetical processing system 110 is shown for processing or treating various fluids or materials comprising various non-limiting exemplary apparatuses that may be treated with the treatment compositions disclosed herein. The system 110 may be representative of any processing system for the reacting, processing or treatment of one or more different fluids or materials. This may include, but is not limited to, an amine system, a chemical processing system, a food processing system, a gas processing system, a petroleum processing system, a biomatter processing system, and a water processing system.

As shown, the system 110 may include a variety of different components, units, etc. The various components of the system 110 are exemplary only and the system 110 is not meant to be limited to only the components or the particular configuration or arrangement of components shown. The system 110 may be used with continuous process with continuous or periodic fluid or material flow throughout all or portions of the system 110 or may be used in batch processes of a combination of batch and continuous processes. The components of the system 110 may include one or more columns, towers, or reactors 112, 114. Pipes or lines, such as lines 116, 118, 120, 122, 124, 126, 128, 130, 132, 134, 136, may be used to conduct fluids or materials (i.e., gases, liquids, solids or mixtures thereof) to the various components and units of the system 110 in accordance with the selected process or treatment of the system 110. The system 110 may include one or more heat exchangers 138, 140, 142, such as heaters, coolers, boilers, refrigerators, radiators, etc. One or more valves 144, 146 may be provided with the system 110 for regulating material flow through the various pipes and lines. Compressors 148, pumps 150, 152, and separators 154, 156 may also be provided with the system 110. The system 110 may also include storage or holding devices 158, 160, such as storage tanks or vessels, containers, vessels, drums. Other components or units, such as those previously disclosed, may also be part of the system 110 or other systems with which the treatment method may be used.

In utilizing the pretreatment compositions for pretreating the various apparatuses and components thereof, such as those of system 110, the surfaces of the apparatus or apparatus component are contacted with a pretreatment composition by various means. The pretreatment composition may be provided at the site of the apparatus(es) to be pretreated. The apparatuses or components thereof are those fresh or new or fresh-like apparatuses and components that have not been exposed to or contacted with process fluids for only a short time, such as two months, six weeks, four weeks, three weeks, two weeks, one week, 6 days, 5 days, 4 days, 3 days, 2 days, 24 hours, 12 hours, or one hour or less or that have had surface deposits removed. The pretreatment composition can be provided in one or more stationary or mobile storage tanks that are in proximity to the apparatus(es) being treated. In other instances, the pretreatment composition supply may be remote from the treatment site, with the pretreatment composition being supplied via a pipeline or conduit to the treatment site. The pretreatment may be used for interior and/or exterior surfaces of the apparatus(es).

Contacting of the surfaces of the apparatuses with the pretreatment composition can be carried out in a variety of ways. This can include spraying the composition on the surfaces of the apparatuses using a suitable spraying device or apparatus that is in fluid communication to the one or more storage tanks in which the pretreatment composition is stored. The surfaces of the apparatuses may also be contacted by filling the apparatus(es) with the pretreatment composition. This may be a full filling of the apparatus, wherein the apparatus is completely filled with the composition, or a partial filling of the apparatus. The pretreatment composition can be brushed, rolled, swabbed or otherwise applied on the surfaces utilizing a suitable tool, instrument or application device. This may be done manually, such as with a manual mop, brush, or roller, or with a mechanized or automated applicator.

The pretreatment fluid may also be applied to the surfaces by swirling or splashing of the pretreatment composition onto the surfaces of the apparatuses. In such cases, such as with a tank or storage vessel, the tank or vessel may be filled or partially filled with the pretreatment composition, and the pretreatment composition is splashed or swirled onto the surfaces of the apparatus. This may be done manually or with mechanized or automated equipment. In some cases, the apparatus itself, such as a mixing tank with an agitator, may have such equipment to facilitate such splashing or swirling. In other applications, this may be provided solely for the pretreatment method. The apparatuses may also be submerged in the pretreatment composition.

In many instances, the surfaces of the apparatus are contacted with the composition merely by flowing the pretreatment composition through the apparatus or system of apparatuses, as with the pretreatment of the pipelines previously described. This may be with or without a separate carrier fluid. This may utilize the various components of the apparatus or system, as they would normally be used in the processes for which they are configured. In certain cases, a combination of the various application methods may be used, such as where flowing of the pretreatment composition is not possible or is only possible with only some or portions of the apparatuses or systems.

The amount of pretreatment composition used for the apparatuses may be that to provide a selected thickness of the pretreatment composition on the surfaces, such as those thicknesses described with respect to the pipelines. The applied pretreatment composition is allowed to reside upon the surfaces of the apparatus for a period of time after it is applied. The residence time that the treatment composition is allowed to reside on the apparatus surfaces after its application may range from 10 minutes or more before the apparatus is brought into operation. In many instances, the residence time may range from 10 minutes to several days, more particularly from 1 hr to 48 hrs, and still more particularly from 3 hrs to 24 hours. In particular embodiments, the pretreatment composition is allowed to reside on the walls or surfaces of the apparatus from at least, equal to, and/or between any two of 10 min, 20 min, 30 min, 40 min, 50 min, 1 hr, 2 hrs, 3 hrs, 4 hrs, 5 hrs, 6 hrs, 7 hrs, 8 hrs, 9 hrs, 10 hrs, 11 hrs, 12 hrs, 13 hrs, 14 hrs, 15 hrs, 16 hrs, 17 hrs, 18 hrs, 19 hrs, 20 hrs, 21 hrs, 22 hrs, 23 hrs, 24 hrs, 25 hrs, 26 hrs, 27 hrs, 28 hrs, 29 hrs, 30 hrs, 31 hrs, 32 hrs, 33 hrs, 34 hrs, 35 hrs, 36 hrs, 37 hrs, 38 hrs, 39 hrs, 40 hrs, 41 hrs, 42 hrs, 43 hrs, 44 hrs, 45 hrs, 46 hrs, 47 hrs, and 48 hrs before it is brought into operation.

The pretreatment composition incorporating the inorganic nanoparticles helps slicken or reduce friction of the surfaces of the apparatuses to lessen pressure drops and to prevent or reduce the formation of deposits on the surfaces of the various apparatuses. The inorganic nanoparticles or colloidal silica dispersion may be charged or ionic to facilitate their adherence to the apparatus walls. When such charged nanoparticles (i.e., positively charged) of the ionic dispersion are used in apparatuses that are provided with cathodic corrosion protection, they are attracted to the surfaces of such apparatuses so that they tend to adhere to the surfaces.

After the desired residence time is reached, excess pretreatment composition can be removed and the apparatus can be brought into operation. Removal of excess pretreatment composition can be through mechanical means, such as scrubbing, scraping, etc. Such mechanical means may be manual or mechanized.

A further fluid that may be used as a flushing fluid that does not contain the colloidal particle dispersion may also be used for removing the pretreatment composition. The flushing fluid may be applied to the surfaces, as with the pretreatment composition, by spraying, filling, brushing, swabbing, splashing, swirling, submerging and flowing it over the surfaces of the apparatus. In particular applications, where the apparatus is configured with an interior for storing or conducting fluids, the flushing liquid may be introduced into the interior through an inlet, with the flushing fluid forcing or carrying the pretreatment composition through an outlet or opening that communicates with the interior of the apparatus.

The flushing fluid may be a liquid, gas, or a combination of liquid and gas. Liquids may include water, aqueous liquids, hydrocarbon liquids, such as petroleum liquids, etc., and combinations of these. Gases may include air, steam, nitrogen gas, hydrocarbon gas, natural gas, etc., and mixtures of such gases. The liquids and/or gases may be inert or non-reactive with the materials of the apparatus and the fluids or materials with which the apparatuses are used so they do not interfere with their use. In some cases, the process fluids normally used with the apparatus may be used as the flushing fluid.

The pretreatment operation may be conducted one or more times so that the desired level pretreatment is achieved. A combination of both the mechanical and fluid flush removal methods of the excess pretreatment composition can also be used in many instances.

In some embodiments, the pretreatment with the composition is carried out before assembly, installation or construction of the apparatus or system. In such embodiments, one or more or all of the components of the apparatus or system are pretreated with the composition before it is assembled, installed or constructed in a similar manner to the pipeline and apparatus components discussed previously. This may be done offsite or away from the site where the apparatus or system is to be assembled, installed or constructed. The pretreatment may be carried out at a surface location, with some or all of the components of the apparatus or system being subsequently buried beneath the earth or submerged in water during its installation and construction.

In many instances, the colloidal particle dispersion will be that having inorganic nanoparticles that are positively charged nanoparticles. Moreover, the components of the apparatus or system pretreated with such composition are those that are configured to or intended to undergo cathodic corrosion protection. These are metal materials, such as iron, cast iron, steel, carbon steel, mild or low carbon steel, cast iron, stainless steel, aluminum, copper, metal alloys, galvanized steel, etc. Most large industrial or commercial apparatuses or systems are configured to undergo or are provided with cathodic corrosion protection upon their installation and use. Thus, when the components of the apparatus or system that are pretreated with the colloidal particle dispersion with such positively charged nanoparticles undergo subsequent cathodic protection, the positively charged nanoparticles are drawn to the surfaces of the treated component so that they will tend to adhere to the treated surfaces during the operation of the apparatus or system.

In some applications, the pretreatment with the colloidal particle dispersion may be carried out while the apparatus or system component temporarily undergoes cathodic protection as part of the pretreatment process. The component may be electrically connected to a sacrificial anode or have an external current applied to the component during the pretreatment process. This may be offsite or away from the assembly or final installation or construction site of the apparatus or system. Thereafter, this cathodic protection may be suspended after the pretreatment has been completed and reapplied after or during the installation or construction or operation of the apparatus or system.

In a method of use or operation, at least one or more pretreated components of a pipeline, apparatus or system that has been pretreated with the treatment composition of a colloidal particle dispersion, as has been described above, is utilized in a pipeline, apparatus or system. Such pretreated component is then subjected to cathodic protection by electrically coupling it to a sacrificial anode and/or an electric current during its use or operation of the pipeline, apparatus or system. The pretreated component is that having surfaces previously treated with a coating of a treatment composition of a colloidal particle dispersion having inorganic nanoparticles with an average particle size from 500 nm or less that exhibit properties of Brownian motion, with at least some or all of the inorganic nanoparticles being positively charged nanoparticles. The pretreated surfaces are those surfaces that are fresh surfaces or surfaces where any residues or deposits that have been previously formed on the surfaces from prior material contact have been removed prior to being treated.

As can be seen, various apparatuses that would benefit from reduced friction and reduction of surface deposits resulting from contact with process fluids can pretreated with the pretreatment composition in much the same way as the pipelines, as they have been previously described. This is a great advantage in commercial and industrial plants and systems where reduction in friction and pressure drop is desired and where the elimination or reduction in surface deposits is desired. The pretreatment of these devices and apparatuses or components thereof with the pretreatment composition is simple, fast, and effective and can result in improved operation and increased life of the equipment and reduce the number of cleaning operations and/or increase the time necessary between cleaning operations.

While the invention has been shown in some of its forms, it should be apparent to those skilled in the art that it is not so limited but is susceptible to various changes and modifications without departing from the scope of the invention. Accordingly, it is appropriate that the appended claims be construed broadly and in a manner consistent with the scope of the invention.

I claim:

1. A method of operating a pipeline or apparatus, the method comprising:

subjecting at least one pretreated component of a pipeline or apparatus to electrochemical corrosion protection, the at least one pretreated component having surfaces previously treated with a coating of a treatment composition of a colloidal particle dispersion having inorganic nanoparticles with an average particle size from 500 nm or less that exhibit properties of Brownian motion, at least some of the inorganic nanoparticles being ionically charged nanoparticles, the surfaces being fresh surfaces or surfaces where any residues or deposits that have been previously formed on the surfaces from prior material contact have been removed prior to being treated.

2. The method of claim 1, wherein:

the inorganic nanoparticles are encapsulated in a surfactant.

3. The method of claim 1, wherein:

the pipeline or apparatus or portions thereof are buried beneath a surface.

4. The method of claim 1, wherein:

the ionically charged nanoparticles are cationic nanoparticles.

5. The method of claim 1, wherein:

the ionically charged nanoparticles are anionic nanoparticles.

6. The method of claim 1, wherein:

the inorganic nanoparticles have an average particle size from 300 nm or less.

7. The method of claim 1, wherein:
the inorganic nanoparticles have an average particle size from 0.1 nm to 300 nm.

8. The method of claim 1, wherein:
the pipeline comprises at least one of a gas pipeline and a liquid petroleum pipeline.

9. The method of claim 1, wherein:
the surfaces are treated with a coating of the treatment composition having a thickness from 0.1 mil to 10 mils.

10. The method of claim 1, wherein:
the treatment composition has a pH from 6 to 7.

11. The method of claim 1, wherein:
the apparatus is at least one of a man-made body, a man-made structure, a tank, a storage tank, a vessel, a storage vessel, a mixing vessel, a container, a valve, a pipe, a drum, an aquatic vessel, a reactor, a combustor, a refrigeration unit, a cooling unit, a heat exchanger, a boiler, a radiator, a separator, an evaporator, a pump, a compressor, a tower, a column, a cooling tower, a filter, a filtration unit, a slug catcher, a Joule Thomson (JT) system, a cracking unit, a pyrolysis unit, a refining unit, a coalescer, a dehydrator, an amine unit, an amine treatment system, a chemical processing system, a food processing system, a gas processing system, a petroleum processing system, a biomatter processing system, and a water processing system.

12. The method of claim 1, wherein:
the inorganic nanoparticles are present in the treatment composition in an amount from 0.001 wt % to 60 wt % by total weight of the treatment composition.

13. The method of claim 1, wherein:
the inorganic nanoparticles are present in the treatment composition in an amount from 0.01 wt % to 10 wt % inorganic nanoparticles by total weight of the treatment composition.

14. The method of claim 1, wherein:
the treatment composition further comprises at least one of a surfactant, an amphoteric surfactant, an ionic surfactant, an anionic surfactant, a cationic surfactant, a nonionic surfactant, a drying agent, a glycol, triethylene glycol, propylene glycol, ethylene glycol, glutaraldehyde, a bacteria-reducing agent, a biocide, a pH adjuster, water, an alcohol, a solvent, a dispersant, a non-terpene oil-based moiety, a terpene, a terpenoid, and limonine.

15. The method of claim 1, wherein:
the treatment composition is free of any tetrakis(hydroxymethyl)phosphonium chloride (THPC), tetrakis (hydroxymethyl)phosphonium sulfate (THPS), methanol and ethanol.

16. A method of pretreating a component of a pipeline or apparatus, the method comprising:

selecting a colloidal particle dispersion having inorganic nanoparticles with an average particle size from 500 nm or less that exhibit properties of Brownian motion, at least some of the inorganic nanoparticles being ionically charged nanoparticles;

selecting a component of a pipeline or apparatus configured to undergo electrochemical corrosion protection;

contacting the surfaces of the component of the pipeline or apparatus with a treatment composition comprising the colloidal particle dispersion, the surfaces of the pipeline or apparatus being surfaces of a fresh pipeline or apparatus and/or surfaces of a non-fresh pipeline or apparatus where any residues or deposits that have been previously formed on such surfaces of the non-fresh pipeline or apparatus from prior material contact have been removed; and subjecting the component of the pipeline or apparatus to electrochemical protection.

17. The method of claim 16, wherein:
the ionically charged nanoparticles are at least one of cationic nanoparticles and anionic nanoparticles.

18. The method of claim 16, wherein:
the inorganic nanoparticles have an average particle size from 0.1 nm to 300 nm.

19. The method of claim 16, wherein:
the at least one component is treated with a coating of the treatment composition having a thickness from 0.1 mil to 10 mils.

20. The method of claim 16, wherein:
the apparatus is at least one of a man-made body, a man-made structure, a tank, a storage tank, a vessel, a storage vessel, a mixing vessel, a container, a valve, a pipe, a drum, an aquatic vessel, a reactor, a combustor, a refrigeration unit, a cooling unit, a heat exchanger, a boiler, a radiator, a separator, an evaporator, a pump, a compressor, a tower, a column, a cooling tower, a filter, a filtration unit, a slug catcher, a Joule Thomson (JT) system, a cracking unit, a pyrolysis unit, a refining unit, a coalescer, a dehydrator, an amine unit, an amine treatment system, a chemical processing system, a food processing system, a gas processing system, a petroleum processing system, a biomatter processing system, and a water processing system.

* * * * *